(12) United States Patent
Meinzinger et al.

(10) Patent No.: US 10,155,337 B2
(45) Date of Patent: *Dec. 18, 2018

(54) BLOW MOLD ARRAY, STRETCH BLOW MOLDING MACHINE AND METHOD

(71) Applicant: KRONES AG, Neutraubling (DE)

(72) Inventors: Rupert Meinzinger, Kirchroth (DE); Klaus Voth, Obertraubling (DE); Thomas Albrecht, Beilngries (DE); Erik Blochmann, Neutraubling (DE); Martin Seger, Neumarkt i.d.Opf. (DE); Konrad Senn, Regensburg (DE); Frank Winzinger, Regensburg (DE); Matthias Wallner, Regensburg (DE); Christian Stoiber, Michelsneukirchen (DE); Harald Steinberger, Thalmassing (DE); Thomas Hoellriegl, Teublitz (DE); Hans-Juergen Fleischmann, Steinberg am See (DE)

(73) Assignee: KRONES AG (DE)

( * ) Notice: Subject to any disclaimer, the term of this patent is extended or adjusted under 35 U.S.C. 154(b) by 915 days.

This patent is subject to a terminal disclaimer.

(21) Appl. No.: 14/546,789

(22) Filed: Nov. 18, 2014

(65) Prior Publication Data
US 2015/0076748 A1    Mar. 19, 2015

Related U.S. Application Data

(62) Division of application No. 13/319,308, filed as application No. PCT/EP2010/056184 on May 6, 2010, now Pat. No. 8,894,404.

(30) Foreign Application Priority Data

May 6, 2009  (DE) .................. 10 2009 019 845
Oct. 26, 2009  (DE) .................. 10 2009 050 637

(51) Int. Cl.
*B29C 49/42*  (2006.01)
*B29C 33/30*  (2006.01)
(Continued)

(52) U.S. Cl.
CPC ........ *B29C 49/4273* (2013.01); *B29C 33/305* (2013.01); *B29C 33/306* (2013.01);
(Continued)

(58) Field of Classification Search
None
See application file for complete search history.

(56) References Cited

U.S. PATENT DOCUMENTS 3,843,286 A    10/1974   Horberg, Jr. et al. ..... 425/387 B
4,046,498 A     9/1977   Appel et al. .................. 425/526
(Continued)

FOREIGN PATENT DOCUMENTS

CN    200998911    1/2008    ............. B29C 49/48
CN    101232988    7/2008    ............. B29C 49/42
(Continued)

OTHER PUBLICATIONS

Extended European Search Report (w/o translation) issued in related application No. 14180647.1, dated Oct. 17, 2014 (8 pgs).
(Continued)

*Primary Examiner* — Monica A Huson
(74) *Attorney, Agent, or Firm* — Hayes Soloway P.C.

(57) ABSTRACT

A blowing mold array includes a blowing mold unit forming a cavity, inside of which plastic preforms are expanded to plastic containers. The blow mold unit includes a blowing mold retainer having at least two mold retainer elements for accommodating parts of the blowing mold unit, and a locking mechanism to arrest at least one part of the blowing mold unit against at least one mold retainer element. The locking mechanism includes an engagement element that
(Continued)

can be pivoted and/or shifted relative to a default axis, which in an arrested state abuts a segment of a part of the blowing mold unit. The locking mechanism has an actuating element to loosen the arrest between the mold retaining element and the blowing mold unit. Actuation of the actuating element is coupled with actuation of the engagement element.

16 Claims, 28 Drawing Sheets

(51) Int. Cl.
  *B29C 49/48*   (2006.01)
  *B29C 49/56*   (2006.01)
  *B29C 33/26*   (2006.01)
  *B29C 49/06*   (2006.01)
  *B29L 31/00*   (2006.01)
  *B29C 49/62*   (2006.01)

(52) U.S. Cl.
  CPC ............ *B29C 49/48* (2013.01); *B29C 49/56* (2013.01); *B29C 33/26* (2013.01); *B29C 49/06* (2013.01); *B29C 49/4823* (2013.01); *B29C 2049/4856* (2013.01); *B29C 2049/4864* (2013.01); *B29C 2049/4889* (2013.01); *B29C 2049/563* (2013.01); *B29C 2049/627* (2013.01); *B29L 2031/7158* (2013.01)

(56) References Cited

U.S. PATENT DOCUMENTS

| | | | | |
|---|---|---|---|---|
| 4,063,867 | A | 12/1977 | Janniere | 425/526 |
| 4,251,204 | A | 2/1981 | Hehl | 425/582 |
| 4,472,128 | A | 9/1984 | Ruhl | 425/186 |
| 5,114,335 | A | 5/1992 | Tinsley | 425/577 |
| 5,968,560 | A | 10/1999 | Briere et al. | 425/192 R |
| 6,120,279 | A | 9/2000 | Vovan | 425/190 |
| 6,615,472 | B2 | 9/2003 | Petre | 29/426.1 |
| 6,851,944 | B2 | 2/2005 | Effenberger | 425/195 |
| RE39,769 | E | 8/2007 | Briere et al. | 264/537 |
| RE41,572 | E | 8/2010 | Briere et al. | 425/195 |
| 8,038,429 | B2 | 10/2011 | Linke et al. | 425/195 |
| 8,894,404 | B2 * | 11/2014 | Meinzinger | B29C 33/305 264/523 |
| 8,920,151 | B2 | 12/2014 | Meinzinger et al. | 425/186 |
| 2002/0076463 | A1 | 6/2002 | Petre | 425/192 |
| 2004/0202745 | A1 | 10/2004 | Tsau et al. | 425/522 |
| 2006/0172035 | A1 | 8/2006 | Miller | 425/525 |
| 2007/0212442 | A1 | 9/2007 | Nonogaki | 425/541 |
| 2009/0136613 | A1 | 5/2009 | Linke et al. | 425/541 |

FOREIGN PATENT DOCUMENTS

| | | | |
|---|---|---|---|
| CN | 201165049 | 12/2008 | ............ B29C 49/48 |
| DE | 3420952 | 12/1984 | ............ B21D 37/14 |
| DE | 3613543 | 12/1986 | ............ B23Q 1/00 |
| DE | 8812265 | 12/1988 | ............ B23Q 1/00 |
| DE | 69609605 | 4/2001 | ............ B29C 33/30 |
| DE | 10152050 | 5/2003 | ............ B29C 49/42 |
| DE | 102005035233 | 4/2007 | ............ B29C 33/30 |
| DE | 102009019845.8 | 5/2009 | ............ B29C 49/28 |
| DE | 102009050637 | 11/2010 | ............ B29C 49/28 |
| DE | 102009039695 | 3/2011 | ............ B29C 33/30 |
| EP | 2803468 | 6/2016 | ............ B29C 33/30 |
| FR | 2552366 | 3/1985 | ............ B23Q 1/00 |
| FR | 2 659 265 | 9/1991 | ............ B29C 49/56 |
| WO | WO 2005/042231 | 12/2005 | ............ B29C 49/48 |
| WO | WO 2007/012308 | 1/2007 | ............ B29C 49/48 |
| WO | WO2010128104 | 11/2010 | ............ B29C 49/48 |

OTHER PUBLICATIONS

Extended European Search Report (no translation) issued in application No. 14180712.3, dated Nov. 6, 2014 (7 pgs).
Chinese Office Action issued in application No. 2015100972991, dated Jul. 4, 2016 (17 pgs).
Chinese Second Office Action issued in application No. 2015100972991, dated Jan. 4, 2017 (16 pgs).
German Office Action issued in application No. 10 2009 050 637.3, dated Apr. 5, 2017 (12 pgs).
Notice of opposition to a European patent, patent No. EP2803468, dated Mar. 22, 2017 (35 pgs).
Extended European Search Report issued in application No. 17171941.2, dated Oct. 26, 2017 (22 pgs).
U.S. Appl. No. 13/319,308, filed Dec. 23, 2011.
Chinese Second Office Action issued in related application No. 2010800199918, dated Apr. 16, 2014 (10 pgs).
European Office Action issued for 10 718 585.2, dated Oct. 1, 2012 (9 pgs).
German Search Report, dated Nov. 2, 2011 (6 pgs).
International Search Report, PCT/EP2010/056184; dated Jul. 20, 2011 (16 pgs).
Office Action issued in related U.S. Appl. No. 13/319,308, dated Feb. 14, 2014 (24 pgs).
Notice of Allowance issued in related U.S. Appl. No. 13/319,308, dated Sep. 8, 2014 (37 pgs).
European Office Action (w/machine translation) issued in application No. 14180712.3, dated Jul. 6, 2017 (15 pgs).
Extended European Search Report (w/machine translation) issued in application No. 17190221.6, dated Dec. 12, 2017 (16 pgs).

* cited by examiner

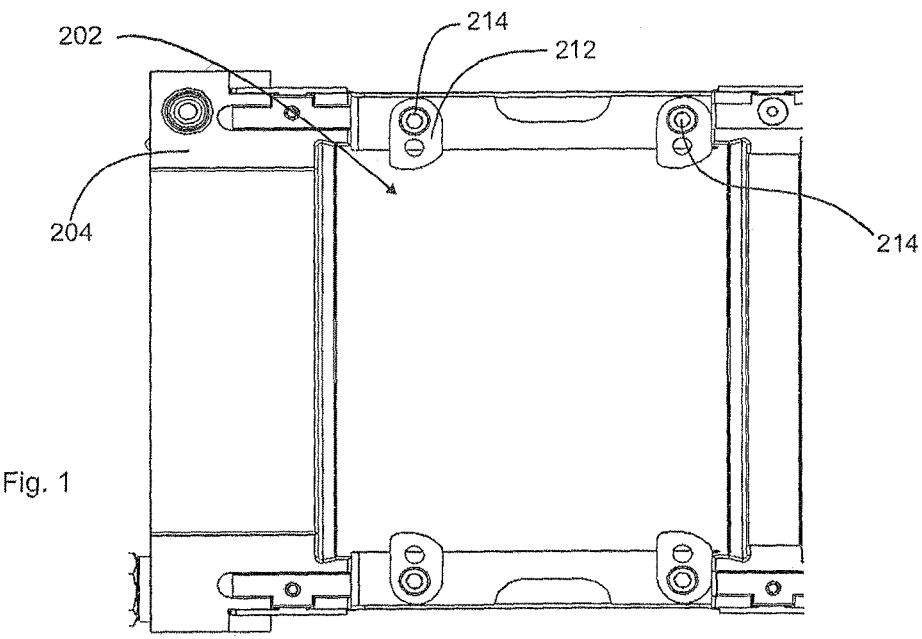
Fig. 1
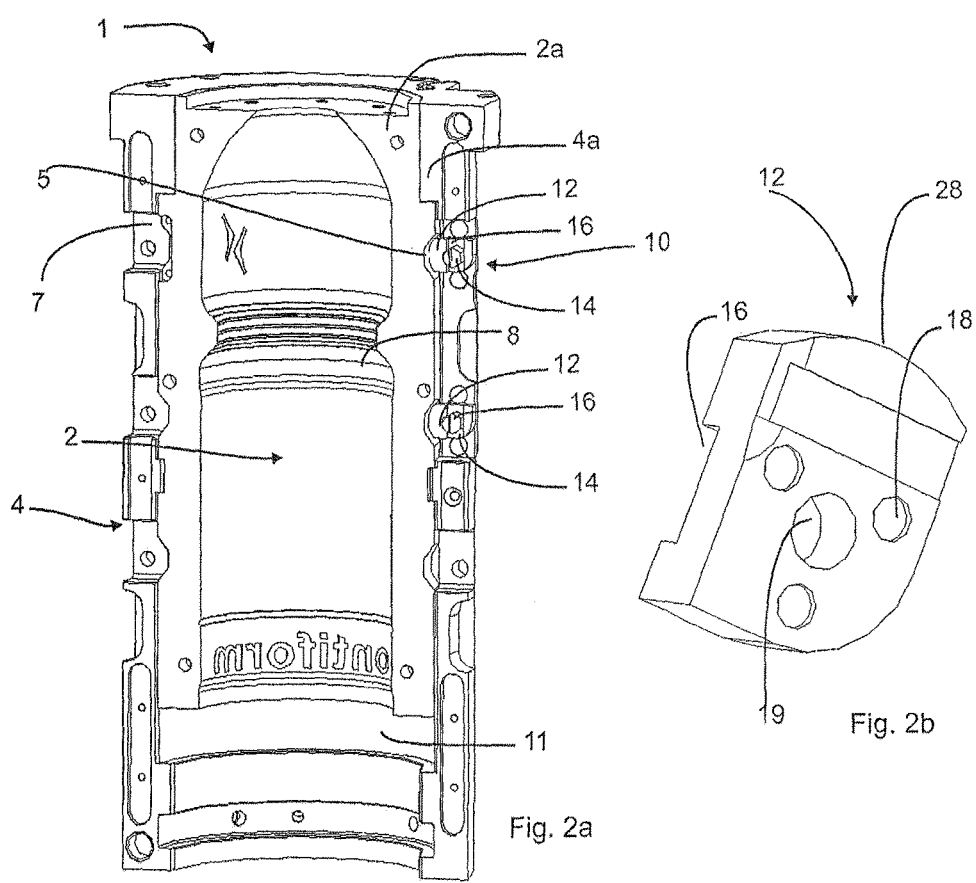
Fig. 2a
Fig. 2b

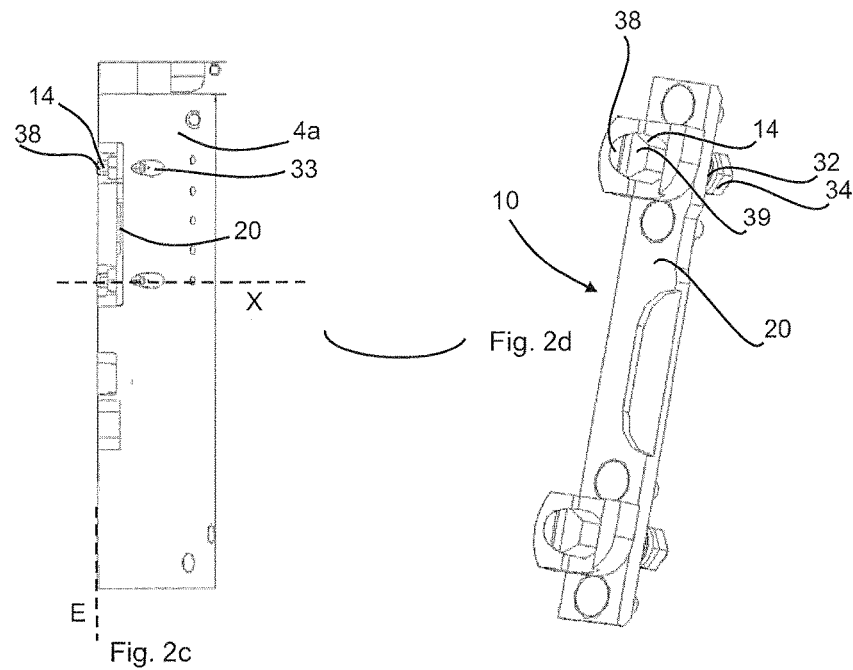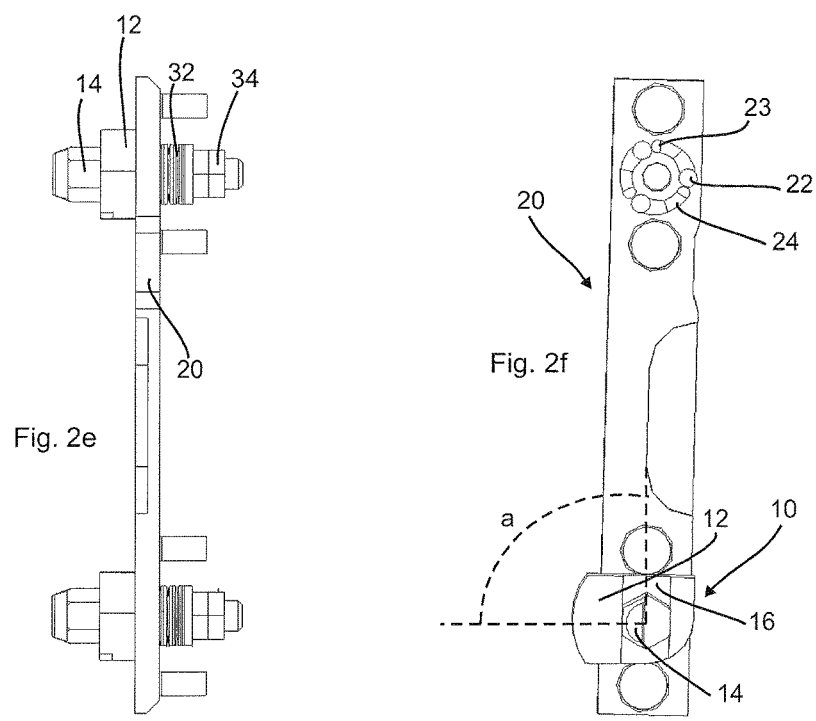

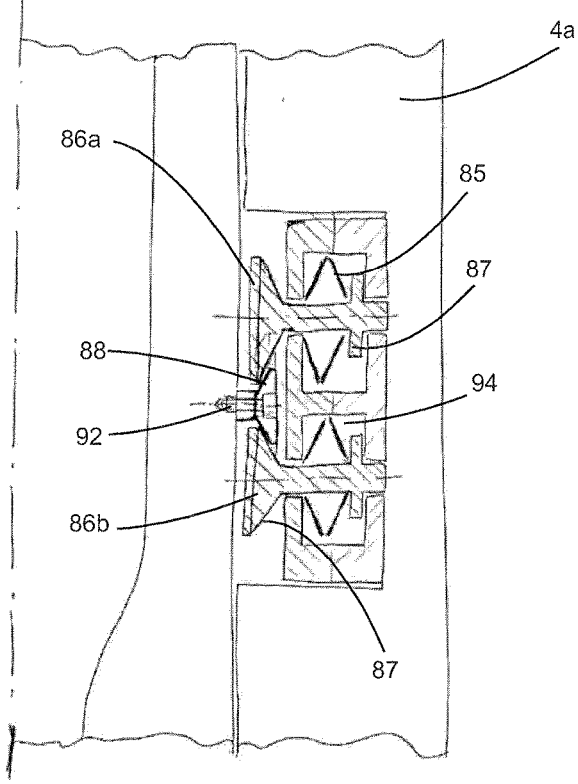
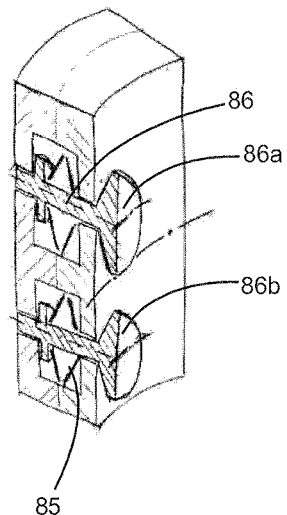
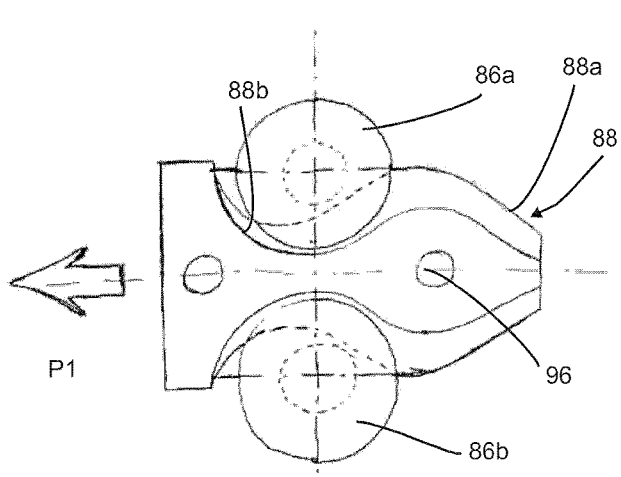

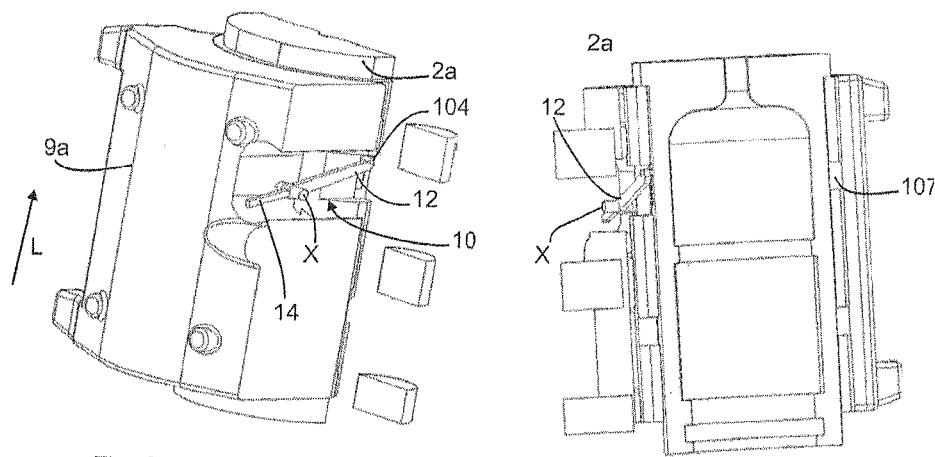
Fig. 6a
Fig. 6b
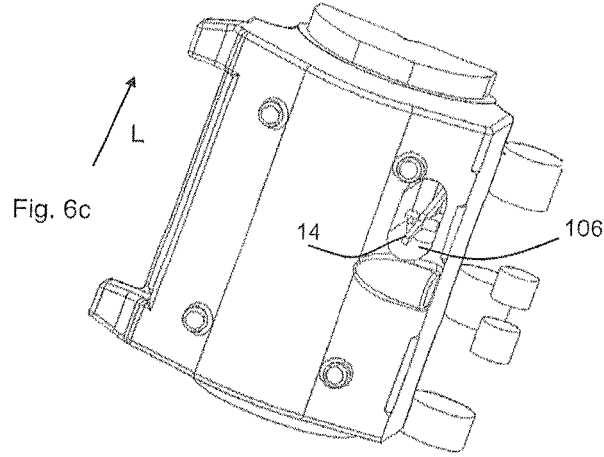
Fig. 6c
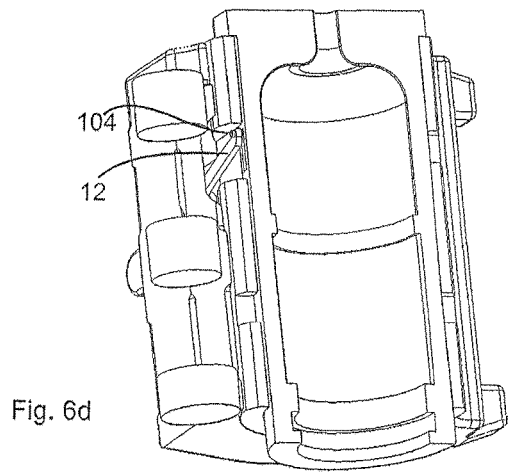
Fig. 6d

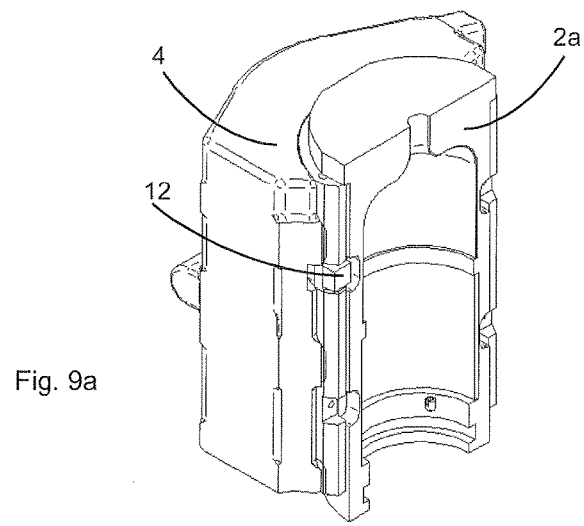
Fig. 9a
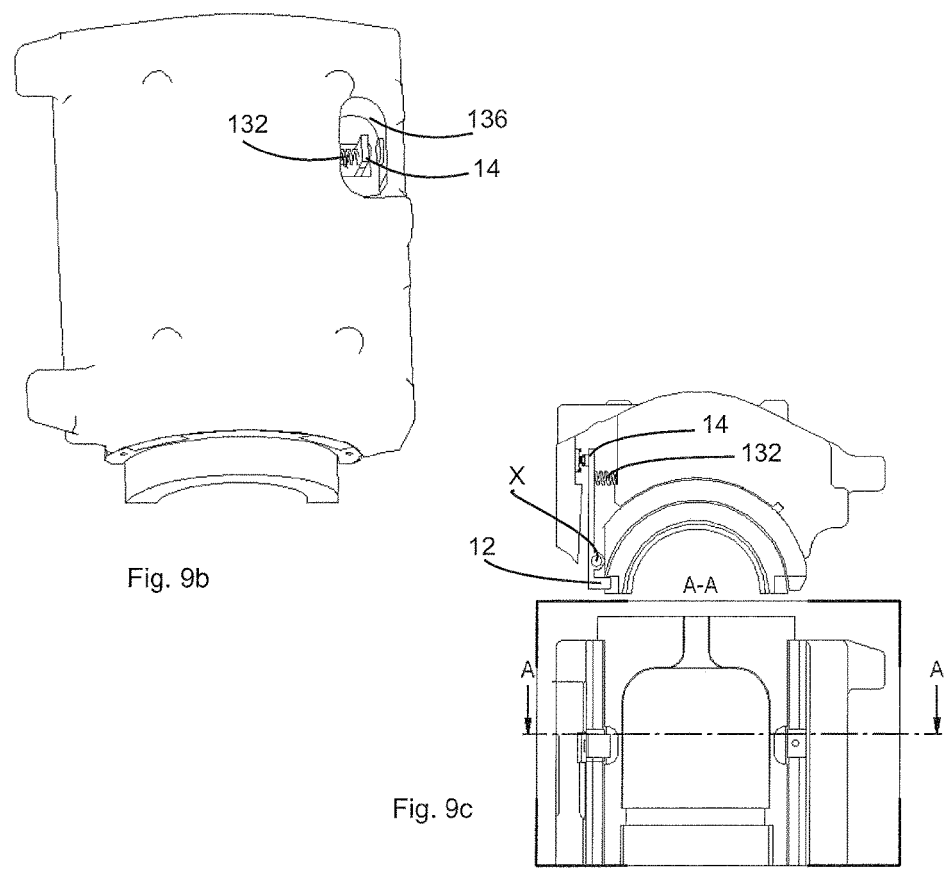
Fig. 9b
Fig. 9c

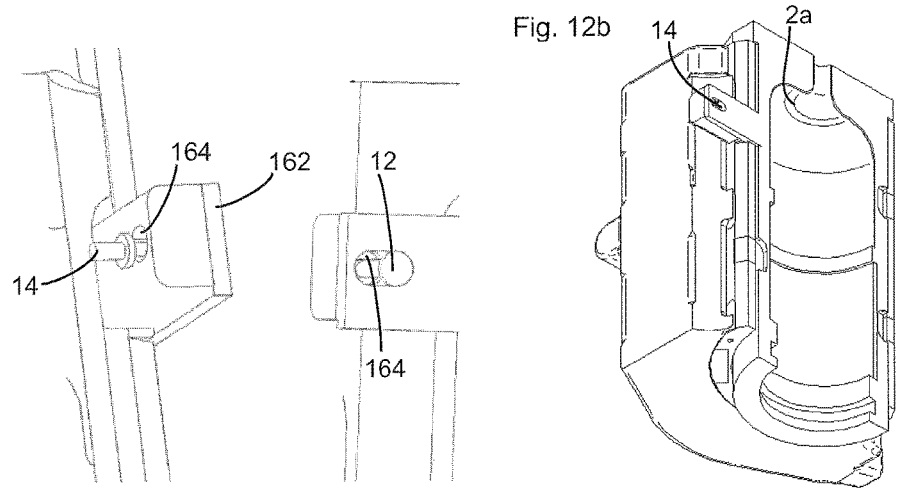
Fig. 12a
Fig. 12b
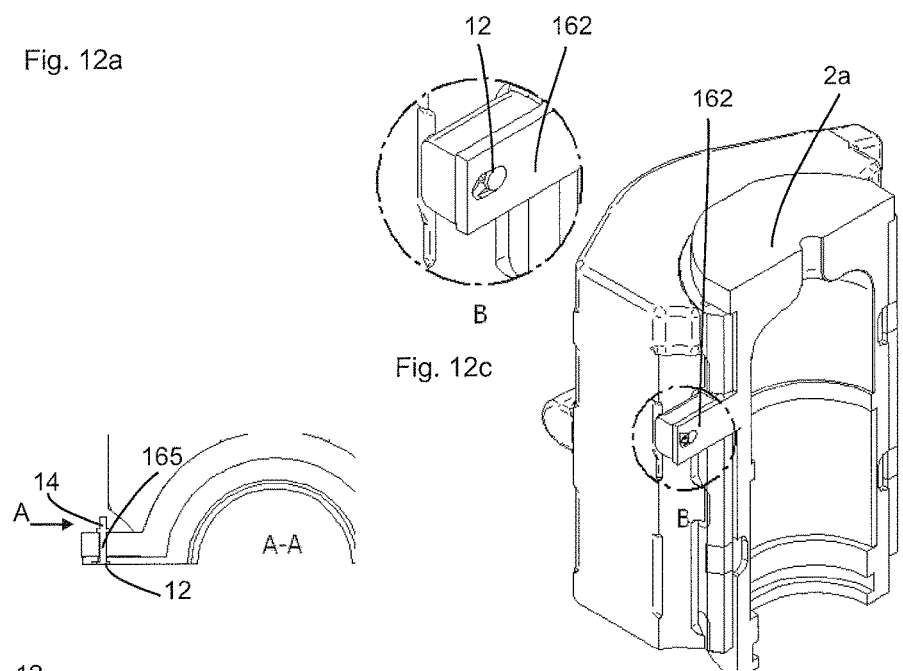
Fig. 12c
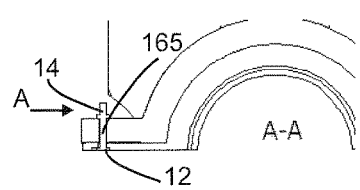
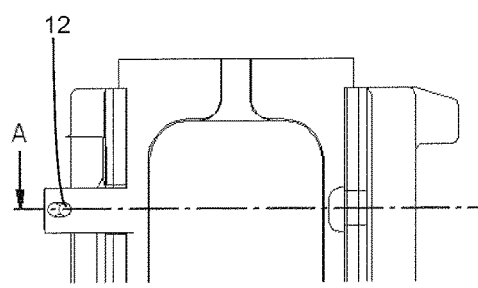
Fig. 12d

BLOW MOLD ARRAY, STRETCH BLOW MOLDING MACHINE AND METHOD

CROSS REFERENCE TO RELATED APPLICATION

This application is a divisional of co-pending U.S. patent application Ser. No. 13/319,308, filed Nov. 7, 2011.

BACKGROUND OF THE INVENTION

The present invention relates to a blow mould assembly for producing plastic containers. Such blow mould assemblies have been known from the prior art for a long time. These blow mould assemblies are here components of blow moulding stations, within which the plastic preforms are expanded into plastic containers. To this end, these blow mould assemblies usually include a blow mould, the inner wall of which is adapted to the contour of the container to be produced. The preforms are expanded into plastic containers by means of air pressure.

The blow moulds are here replaceably arranged in blow mould carriers or master moulds. If these blow moulds wear out, but also when a change to another container type is to be made, said blow moulds are here removed from the blow mould carriers and are replaced with different blow moulds. Such a replacement of the blow moulds is a relatively complex procedure in the prior art. Thus, to start with, several fastening bolts have to be released and then claws or locking brackets have to be pivoted out of the way in order to release the blow mould. Also the reassembly of a blow mould is a relatively complex procedure. At times during the installation, the locking brackets hamper the insertion of the blow moulds into the mould carrier or the master mould and/or the mould shell, which insertion has to be carried out first.

The present invention will be described primarily with reference to the arrangement or fastening of a blow mould on a mould carrier shell, however, it is to be noted that the invention is also applicable to the assembly of a blow mould on a master mould, to the assembly of a master mould on a mould carrier shell or a blow mould carrier, and also to the assembly of a mould carrier shell or a master mould on a blow mould carrier. Therefore, apart from the terms master mould, blow mould carrier or blow mould shell, also the term blow mould holder will be used below, which may refer both to a master mould, a blow mould shell and a blow mould carrier. In this context, the term blow mould holder therefore refers to an element which at least partially receives a further element, i.e. the blow mould holder is in particular an element that receives a further element.

Further, apart from the terms blow mould, master mould and mould carrier shell, also the term blow mould unit is used, which can refer both to the blow mould and to the master mould as well as to the blow mould shell, which respectively form a cavity that is used for the expansion of the plastic preform. In the case of the master mould or the blow mould shell, the cavity is used for receiving a blow mould and therefore directly for expanding the plastic preform. Thus, the blow mould unit is in particular an element that is radially disposed within the blow mould holder and is received by said blow mould holder.

DE 10 2005 035 233 A1 describes an apparatus for retaining blow mould segments. Here, an arresting member is provided which is designed both for providing a positive retention and for providing a non-positive retention of the blow mould segment. More specifically, a lever is provided here, by means of which an arresting member can be displaced in order to release the arrest of a blow mould. However, this device, too, may hamper the insertion of blow mould segments.

U.S. Pat. No. 6,615,472 B2 describes a quick-change blow mould assembly. This assembly, too, includes a carrier plate and a blow mould half that can be fixed to the carrier plate.

SUMMARY OF THE INVENTION

The present invention is therefore based on the object of simplifying the assembly and disassembly of such blow mould units in relation to the blow mould holders.

A blow mould assembly according to the invention for moulding plastic preforms into plastic containers includes a blow mould unit (which is in particular received by a further element) that forms a cavity, within which the plastic preforms are formed into plastic containers or that is used for the expansion of the plastic preforms, said blow mould unit being formed in at least two parts.

Further, the assembly includes a blow mould holder for receiving the blow mould unit, said blow mould holder having at least two mould holder elements for receiving components of the blow mould. Further, a locking mechanism is provided in order to arrest at least a part of the blow mould unit relative to at least one mould holder element. The locking mechanism includes here an engagement member that can be pivoted or displaced with respect to a specified axis, which engagement member bears, in an arrested condition of a part of the blow mould unit with respect of a mould holder member, against a section of a part of the blow mould unit.

According to the invention, the locking mechanism includes an actuating member in order to release an arrest condition between the mould holder member and the blow mould unit or the part of the blow mould unit, wherein a movement and in particular a pivoting movement and/or a translational movement of this actuating member is (in particular mechanically) coupled to the movement and in particular the pivoting movement and/or the translational movement of the engagement member. The actuating member is preferably also used for establishing an arrest condition between the mould holder element and the blow mould unit.

Preferably, the blow mould unit is a blow mould that directly forms the cavity for expanding the preform. Advantageously, the blow mould holder is a blow mould shell that directly receives the blow mould. Preferably, the movement of the engagement member and particularly preferably also of the actuating member is a pivoting or rotary movement about the specified axis, and particularly preferably exclusively such a pivoting or rotary movement and no additional translational movement is provided.

Thus, it is proposed according to the invention that a movement and in particular a rotation of the actuating member, which may be for example a screw-nut head or the like, is directly coupled to the movement and in particular the rotation of the engagement member. In this way it can be ensured that, upon releasing the blow mould from the mould carrier, the engagement members will not hamper a reinstallation for example of a further blow mould.

It is possible here for the engagement member to be pivoted in a plane that is parallel to a parting plane that separates the two blow mould halves and/or the mould holder halves from each other. However, it would also be possible for the engagement member to be pivotable about an axis that extends parallel to a longitudinal direction of the containers to be moulded.

In a further advantageous embodiment, a maximum rotary angle of the engagement member is less than 360°, preferably less than 180°, preferably less than 100° and preferably less than 90°. By means of this embodiment it can be achieved that the engagement member can only be rotated about accurately defined angles, and therefore any obstructions by this engagement member during the reinstallation of further blow mould segments can be prevented. Further, very accurately defined rotary positions are achieved for the engagement members. In any event, advantageously no full turn of the engagement member is possible in this way.

In a further advantageous embodiment, the engagement member is disposed on a carrier, and this carrier is disposed on the blow mould holder. It is possible here for the carrier to be a strip-like element that is mounted to the blow mould holder for example using screw connections in a fixed, but detachable manner. On this carrier said engagement members are in turn mounted to be rotatable.

In a further advantageous embodiment, the locking mechanism includes at least two engagement members which are arranged one behind the other in a longitudinal direction of the blow mould unit. This means that the blow mould unit is stabilised or arrested along the longitudinal direction thereof in at least two positions relative to the blow mould holder.

In a further advantageous embodiment, the locking mechanism has at least two engagement members and the blow mould unit is at least partially disposed between these engagement members. This means that the blow mould unit is respectively arrested in relation to the blow mould holder by rotatable engagement members on either side with respect to the cavity or with respect to the container to be expanded. However, it would also be possible for the blow mould unit for example to be hooked into one side without engagement members and for rotatable engagement members to be provided only on the other side.

Preferably, the blow mould unit includes recesses or notches, into which the engagement members engage.

In a further advantageous embodiment, at least one engagement member latches in at least one rotary position. Advantageously, the engagement member latches in exactly two rotary positions and this may here be an open position and a closed position. In this way, in case the blow mould unit is to be disassembled, the individual engagement units can respectively be rotated into the opening position and will latch in this position. When a further blow mould unit is to be inserted, these engagement members will then not hamper the insertion process. Further, the arresting positions of the engagement members are accurately defined in this way.

In a further advantageous embodiment, the engagement member is rotationally supported by means of at least two spherical bodies. Preferably, three such spherical bodies are provided, which are respectively arranged between the engagement member and the blow mould holder and/or between the engagement member and the carrier. The engagement member is supported by these three spherical bodies in a defined manner. Instead of spherical bodies, also cylindrical or conical bodies may be provided.

Further, said spherical bodies are advantageously arranged in raceways. In this way, a rotation of the engagement member in a very simply defined manner would be achieved. Moreover, said raceways may also be used to define the two latching positions of the engagement members in relation to the blow mould holder or in relation to the carrier mentioned above.

In a further advantageous embodiment, the engagement member includes at least one rounded outer surface. Advantageously, this rounded outer surface is provided at one end of the engagement member, which is located opposite an engagement area where the engagement member contacts the blow mould unit in an arrested condition. This rounded outer surface allows a (in particular limited) rotary movement of the engagement member in relation to the blow mould holder.

In a further advantageous embodiment, the blow mould assembly includes a spring unit in order to pretension the engagement member in relation to the carrier and/or the blow mould holder. It is for example possible here for this spring member to be disposed below said carrier and to draw the engagement member towards the carrier. In this context, in particular also the above-mentioned spherical bodies are clamped by said spring member.

In a further advantageous embodiment, the blow mould assembly includes a safety mechanism that prevents a closing of the blow mould unit in case said blow mould unit is not correctly arrested. Thus, it would for example be possible to forget to re-lock individual safety members after the installation of a blow mould. The safety mechanism prevents the blow mould unit from being completely closed, so that the misorientation of a safety member would be obvious to the user who will then be able to remedy this situation.

In a further advantageous embodiment, the blow mould assembly includes at least two actuating members and each of these actuating members in turn includes a projection and a recess, and in a closed condition of the blow mould unit, at least one projection of one actuating member engages in the recess of the other actuating member. Preferably, however, the projections and recesses are arranged in such a way that such a mutual engagement will occur only if both safety units are correctly tightened, otherwise for example the two projections will contact each other and in this way prevent the blow mould unit from being closed.

In a further embodiment, the blow mould assembly includes at least one liquid line having at least one feed connection for feeding liquid, and the blow mould holder includes at least one supply connection for supplying the liquid line with liquid. The feed connection can be connected to the supply connection via a locking process for arresting the blow mould unit with the blow mould holder.

In this embodiment the circumstance is utilised that high forces are applied between the blow mould holder and the blow mould unit as a result of the arrest of the blow mould unit on the blow mould holder. These forces may be used to establish liquid connections between these two members. These liquid connections are preferably used here for tempering the blow mould unit. In this way, an additional process for connecting liquid lines to the blow mould may be dispensed with.

Advantageously, the supply connection and the feed connection are connected to each other in a sealing or liquid-tight manner. Particularly preferably, sealing surfaces that can be pressed onto each other are provided for this purpose, and particularly preferably at least one of these sealing surfaces is formed by an elastic material such as for example an O-ring.

It is to be noted that this embodiment can also be applied independently from the exact design of the locking mechanism, i.e. if necessary also in the case of locking mechanisms that are known from the prior art or that are evident from the preamble of claim 1 or claim 16 of the present application.

The present invention is further directed to a blow mould assembly for moulding plastic preforms into plastic containers using a blow mould unit, which blow mould unit forms a cavity, within which the plastic preforms can be expanded into plastic containers, said blow mould unit being formed at least in two parts, and having a blow mould holder for receiving the blow mould unit, said blow mould holder having at least two mould holder members for receiving parts of the blow mould unit.

According to the invention, the blow mould assembly includes means for generating a negative pressure that acts between at least a part of the blow mould unit and at least one mould holder member, and this negative pressure serves to retain this part of the blow mould unit on the mould holder element.

Thus, these means constitute here at the same time preferably also a locking mechanism in order to arrest at least a part of the blow mould unit relative to at least one mould holder member.

In this embodiment it is proposed to arrest the blow mould (if necessary exclusively) on the blow mould holder by means of a negative pressure or a vacuum. Said means for generating and in particular also for maintaining a negative pressure may here include a vacuum source. It would also be possible for a movable piston to be provided in a wall of the mould holder member, which piston generates or maintains said vacuum.

Preferably, the blow mould assembly includes a valve unit, such as in particular, but not exclusively, a non-return valve that is used for maintaining the negative pressure.

The present invention is further directed to a stretch blow moulding machine having a plurality of blow moulding stations, in which blow moulding stations plastic preforms can be moulded into plastic containers. According to the invention, at least one of these blow moulding stations includes a blow mould assembly of the type described above.

The present invention is further directed to a method for arresting at least a part of a blow mould unit relative to a blow mould holder that receives the blow mould unit. According to the invention, a part of the blow mould unit is here retained on the blow mould holder or on a part of the blow mould holder by means of negative pressure.

BRIEF DESCRIPTION OF THE DRAWINGS

Further advantages and embodiments will become evident from the attached drawings, wherein:

FIG. 1 shows a blow mould assembly according to the prior art;

FIGS. 2a-2f show a first embodiment of a blow mould assembly according to the invention;

FIGS. 5a-5f show a fourth embodiment of a blow mould assembly according to the invention;

FIGS. 6a-6d show a fifth embodiment of a blow mould assembly according to the invention;

FIGS. 9a-9c show an eighth embodiment of a blow mould assembly according to the invention;

FIGS. 12a-12d show an eleventh embodiment of a blow mould assembly according to the invention;

DETAILED DESCRIPTION OF THE DRAWINGS

Figure 3A:
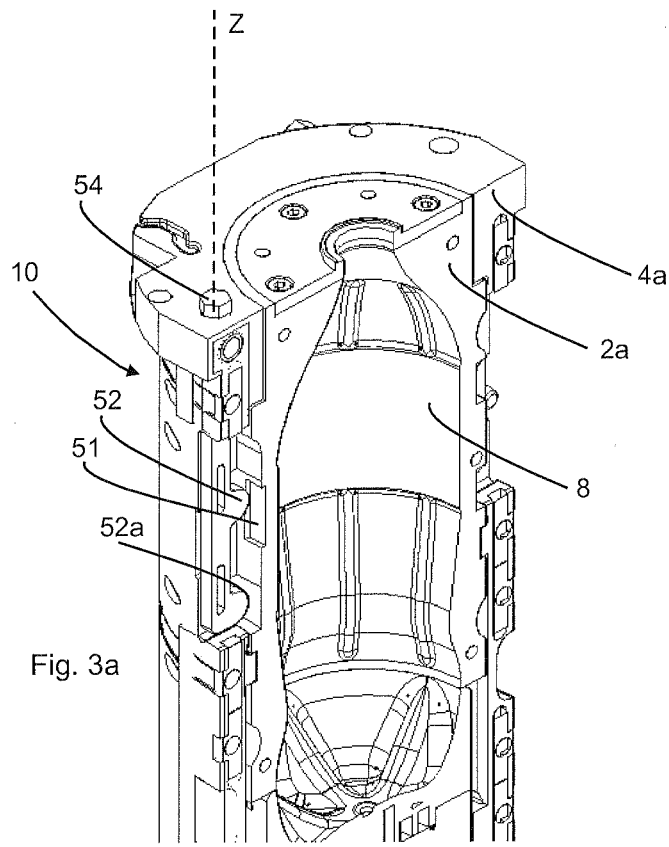
FIGS. 3a-3h show a second embodiment of a blow mould assembly according to the invention.

FIG. 1 shows a partial view of a blow mould assembly according to the prior art. Reference numeral 204 relates here to a blow mould shell, more specifically to a part of such a blow mould carrier. In this blow mould carrier, a blow mould (not shown) is to be mounted, as indicated by reference numeral 202. In order to lock this blow mould in relation to the blow mould shell, four engagement members 212 are provided here, the end sections of which protrude into areas of the blow mould and stabilise the same in this way. Further, four actuating means 214 in the form of screws are provided. If these screws 214 are released, the engagement members 212 can be pivoted about the respective pivot axes X. However, these engagement members 212 are not fixed in their position, but they can freely pivot about said axis X.

FIG. 2a shows a first embodiment of a blow mould assembly according to the invention. Reference numeral 2 relates here again to a blow mould, more specifically to a part 2a of this blow mould. This part 2a is joined with a further part (not shown) in order to mould, in a cavity 8a, a plastic preform into a container. Reference numeral 4 again generally relates to a blow mould shell, more specifically to a part or a half 4a of this blow mould shell. The blow mould 2 has to be arrested in relation to this blow mould shell.

In order to arrest the blow mould or the blow mould halves, four engagement members 12 are provided here, however, only two of these engagement members 12 are shown. These engagement members 12 are here coupled with the actuating members 14 in a rotationally fixed manner, which actuating members may for example be screw heads. In order to achieve this rotationally fixed coupling, the actuating members engage in a groove 16 of the engagement members 12. Thus, by way of a rotation of the actuating members 14, also the engagement members 16 are pivoted about their pivot axis.

Further, recesses 5 that are respectively disposed in part 2a of blow mould 2 can be seen. The engagement members 12 engage into these recesses.

It can further be seen that the blow mould shell 4 itself has recesses 7, into which components of the arresting mechanism can engage, which is in its entirety identified with 10.

In the bottom area of the blow mould shell 4, a base mould (not shown) or a base part can also be provided here.

FIG. 2b shows a perspective view of an engagement member 12. It can be seen that the engagement member has a rounded surface 28 in that area that in an arrested condition faces towards the blow mould. Reference numeral 19 identifies an opening, through which a pin (not shown) of the actuating member 14 is pushed. This opening 19 also defines the pivot axis of the engagement member at the same time. Reference numeral 18 relates to further recesses, in which spherical bodies are arranged, in order to support the engagement member 12 in a rotatable manner. Further, the groove 16 can be seen here again, which provides for a rotationally fixed connection between the actuating member 16 and the engagement member 12.

FIG. 2c shows a lateral view of a blow mould assembly according to the invention. It can be seen here that the actuating member 14 includes a pin that extends into a recess 33 that is provided in the wall of the mould carrier 4a. Via this recess 33, the engagement member 12 can be completely removed. The two actuating members 14 and also the engagement members 12 are here disposed on a common carrier 20, and this common carrier 20 is in turn provided on the mould shell 4a.

FIG. 2d shows a further view of an arresting mechanism according to the invention. What can be seen here in particular are a projection 38 and a recess 39 which are provided on an actuating member 14. These two members 38 and 39 are used as safety means which ensure that only a properly arrested blow mould can be closed. In a mounted condition of the blow mould, a corresponding carrier 20 with an actuating member 14 is also provided on the opposite side, i.e. the blow mould carrier 4b that is not shown. In this case, however, the projection 38 is further away from the blow mould than the recess 39 in a correctly arrested condition, i.e. the other way round compared to the situation shown in FIG. 2d. Thus, the projection which is not shown here can engage in the recess 39.

This means that a corresponding blow mould carrier with the blow mould can be closed only if all of the engagement members 12 are correctly orientated, i.e. respectively contact the blow mould. It can insofar also be seen in FIG. 2c that the projections 38 project slightly beyond the plane E, which at the same time also constitutes a median plane of a closed blow mould carrier.

Reference numeral 34 relates to a screw body such as a screw nut that is used for fixing the actuating member 14.

FIG. 2e shows a further view of an arresting mechanism according to the invention. Here again, the screw nut 34 can be seen, as well as a spring unit 32, such as here a coil spring, which is used to pretension the engagement member 12 relative to the carrier 20. Alternatively, also other spring units such as for example disk springs or disk spring sets can be used.

FIG. 2f shows a further view of the carrier 20, but one of the two engagement members 12 has been removed here. It can be seen that raceways 24 and spherical bodies 22 are provided in the carrier 20. By means of the arrangement of these three raceways 24 it is made possible for the engagement member 12 to be rotated about an accurately defined angle relative to the carrier member 20. More specifically, also three depressions 23 are provided which ensure that altogether one turn of the engagement member 12 relative to the carrier 2 has defined limit and latching positions. Reference sign a identifies the rotary angle of the engagement number 12. This angle is here 90°, but it may also be selected to be different by way of a corresponding arrangement of the respective latching positions.

Figure 3B:
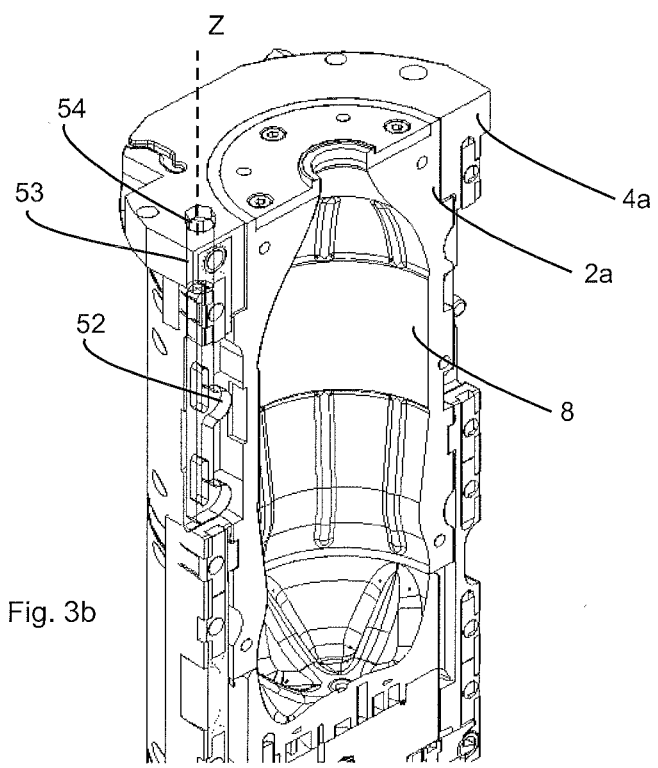

FIGS. 3a-3h show a further embodiment of a blow mould assembly according to the invention. Here, an arresting mechanism 10 is provided, which also includes an actuating member 54 that may be pivotable about an axis Z. Apart from that, however, it is also possible for this actuating member 54 to be displaced in the Z direction, in order to achieve an arrest of part 2a of the blow mould relative to the blow mould shell 4a. In FIG. 3b, the extension of a rod 53 inside the blow mould carrier 4a is illustrated. Reference numeral 52 relates here again to engagement members that engage in an area of the blow mould 2a, in order to retain the same in this way. FIGS. 3a and 3b illustrate an arrested condition of the blow mould segment 2a relative to the mould carrier 4a or the master mould. Here, too, the engagement members 52 have a curved surface or a wedge-shaped surface 52a which, however, is not absolutely necessary.

The rod 53 indicated in FIG. 3b can be twisted by tightening the actuating member 54 or by rotating the same, so that in this way it gets its own spring action. The actuating member 54 shown or this clamping lever in turn has a hexagonal head 54 so that it can be adjusted. It would also be possible here for this actuating member to be disposed on the bottom side of the mould carrier. In this case, the actuating member 54 acts independently from the respectively applied movement on both engagement members 52. A corresponding clamping of the blow mould can also be achieved by way of a longitudinal displacement of the actuating member or also by a combination of a longitudinal displacement with a rotary movement.

Figure 3C:
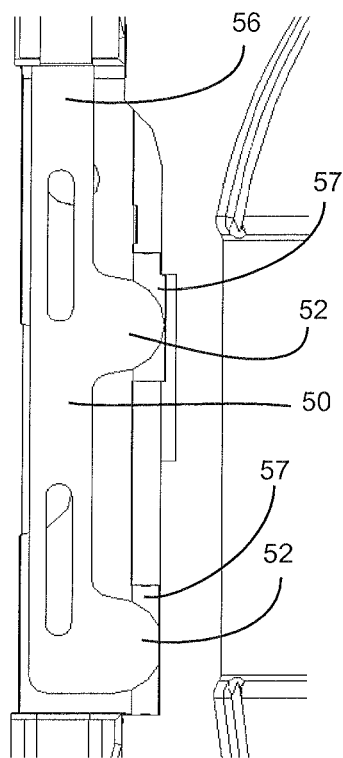
Figure 3D:
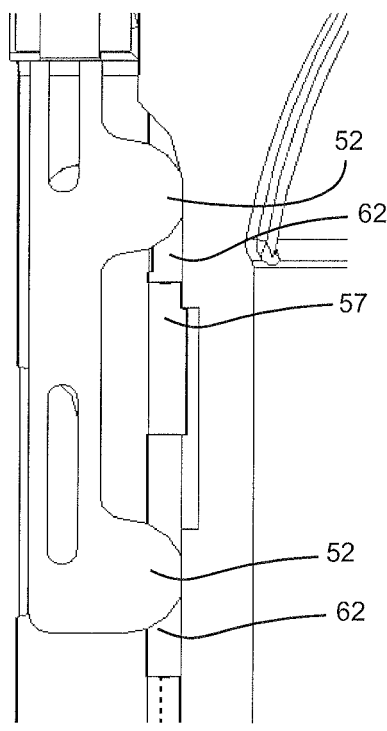

FIG. 3c shows a detailed view of the engagement body 50 with the two engagement members 52. In the illustration shown in FIG. 3c, the engagement body 50 is in the position in which the blow mould 2a can be removed. More specifically, recesses 57 of the blow mould are here respectively provided behind the two engagement members 52, so that a movement of the blow mould 2 vertically to the figure plane is not hampered by the engagement members 52. FIG. 3d shows a clamped position or a locked position of the blow mould. Here, the engagement members 52 rest on webs 62 of the blow mould 2 and prevent in this way the blow mould from being removed.

Thus, in the embodiment shown in FIGS. 3a-3h, the locking of the blow mould relative to the mould carrier is realised by means of a central locking shaft. Correspondingly, also a master mould, which in turn holds the blow mould, could be disposed on a (superordinate) blow mould carrier in this way. As mentioned, the blow mould shell 4 (and if necessary also a pressure pad shown on the left-hand side in the figures) is provided with a vertical through-bore, into which said shaft 53 would be inserted. As shown in the figures, the engagement members or clamping tongues, which replace the engagement members used so far in the prior art, are mounted on the shaft in one piece.

It would further be possible to implement the actuating member 54 together with a locking shaft, which has for example a 90° bend. At this bend, on the one hand an actuating lever would be provided and this could on the other hand also be used for arresting. At the top of the mould carrier 4a or of the blow mould shell, a counter stop could be provided which allows the above-mentioned lever to be easily overturned by 90° so that, as mentioned, the rod 52 would act as a torsion bar spring and would easily bend also in its longitudinal direction. It would further also be possible to actuate the lock as shown in FIGS. 3a-3h either electromagnetically or pneumatically.

Further it is to be mentioned that by means of the arresting mechanism 10 as shown in FIGS. 3a-3c, a relatively high force is applied between the blow mould and the mould carrier, in order to turn for example the blow mould into its master mould or also the master mould in the mould carrier into the final position. Usually, it is also useful to supply water during the working operation of such an apparatus, in order to achieve a tempering of the blow mould and also of the master mould.

For this reason, water hoses are connected in the prior art prior to putting the apparatus into operation. As a result of the mentioned high forces, it is also possible here to effect a connection of the individual hoses whilst arresting the blow mould 2 relative to the blow mould shell and also a blow mould shell relative to a blow mould carrier. In this connection it would for example be possible for a rotatably supported block to be provided at the top of the mould carrier, on the outside of which the water hoses are fixed using simple lock-in connectors.

The inside of such a block could be kept flat or planar, so that it could act as a sealing surface. Correspondingly, quad rings or other sealing members could be integrated in the previous water connections of the master mould or of the blow mould, which sealing members would be pressed firmly against the level surface of the block when the mould is turned in. As a result of this pressing action, a contact can be established at the same time which would allow the blow mould or the master mould to be supplied with water.

It would further be possible for a follower to be provided on the mould shell or the blow mould, which helps to turn said rotatable block into its final position. Thus, it would be possible to bring a master mould into a position in relation to a mould carrier by a single movement or just a few movements, and at the same time to connect the required water connections or water hoses.

Figure 3E:
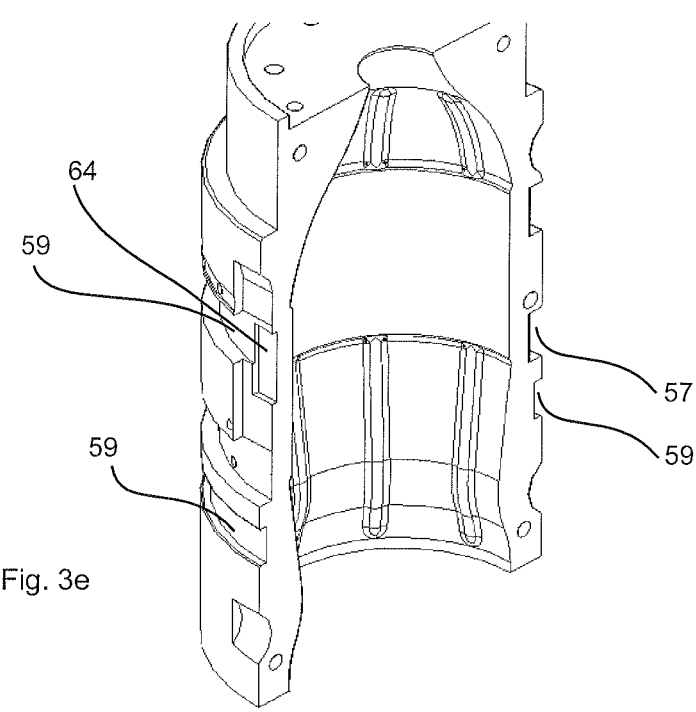
Figure 3F:
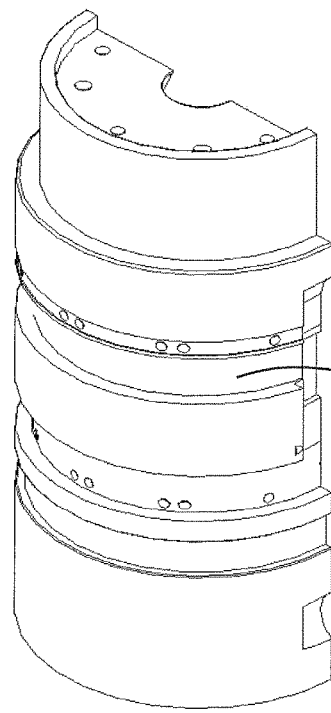

FIG. 3e shows a further view of a blow mould for a blow mould assembly according to the invention. In this embodiment, the blow mould has two circumferential cut-outs 59 so as to enable the blow mould to be completely turned out of the master mould upon unlocking of the engagement body 50. FIG. 3f shows a corresponding view of this blow mould component from the rear.

Figure 3G:
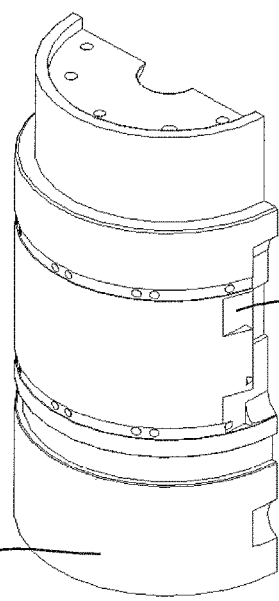

In the illustration shown in FIG. 3g, recesses 57 are provided in the blow mould 2a, in order to remove the blow mould from the mould carrier or the master mould upon unlocking.

Figure 3H:
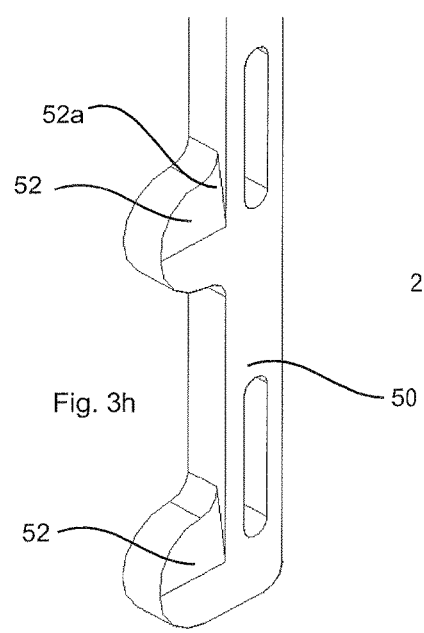

FIG. 3h shows a further view of the engagement body 50 including the two engagement members 52. The subarea or clamping surfaces 52a, which extend here at a slight angle, however, may not be required for tensioning in each and every embodiment. However, it would also be possible to provide the blow mould with a corresponding inclined or clamping surface (in the form of a counter profile). Moreover, corresponding clamping surfaces could also be provided both on the blow mould and on the engagement member.

Figure 4A:
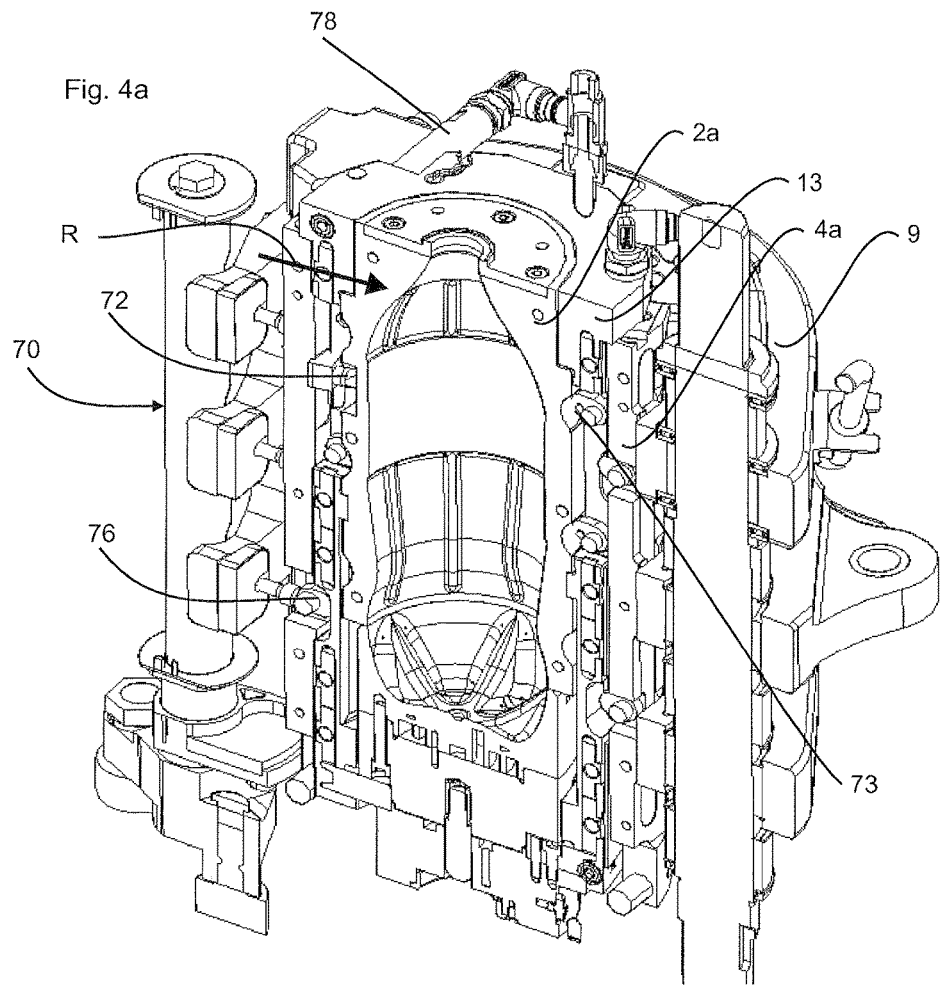
FIGS. 4a-4c show a third embodiment of a blow mould assembly according to the invention.
Figure 4B:
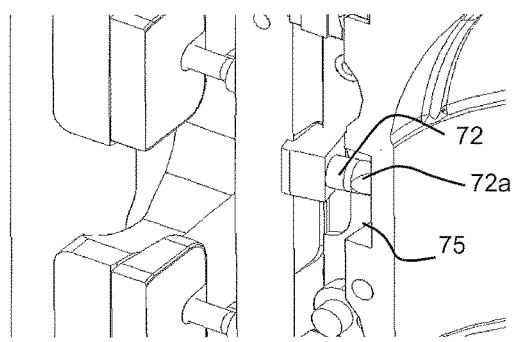
Figure 4C:
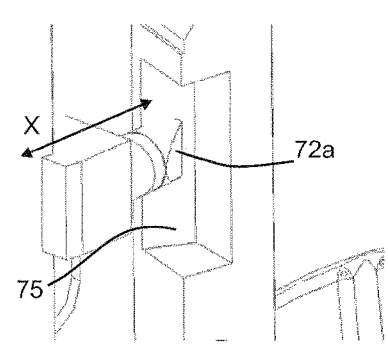

FIGS. 4a-4c show a further embodiment of a blow mould assembly according to the invention. In this view, a blow mould 2a, the master mould 13, a blow mould shell 4a as well as the mould carrier 9 are shown. Here, a pneumatically operated arresting mechanism is provided. More specifically, engagement members 72 are provided here, which are actuated pneumatically in order to arrest the blow mould 2a in relation to the master mould 4a. In the embodiment shown in FIG. 4a, these engagement members 72 are provided only on the left-hand side, which means that the blow mould 2a can be turned in for example against the master mould 13, in order to come to rest in this way against the engagement members 72 for example on the left-hand side. Subsequently, the entire arrest of the blow mould 2a relative to the blow mould shell 4a will then be pneumatically achieved. Apart from an arresting or locking by pneumatic means, however, also the use of a hydraulic, magnetic or mechanical drive would be conceivable.

In the illustration shown in FIG. 4a, the engagement members move in a radial direction R of the blow mould. However, deviating from this, it would also be possible for the engagement members to move in a tangential direction of the blow mould, which means for example in FIG. 4a at an angle into the figure plane. Moreover, in a corresponding embodiment the engagement members could also move here in a tangential direction, here at an angle out of the figure plane. In this way, too, the blow mould could be arrested relative to the blow mould shell or the master mould. Further, the engagement members 72 could also be arranged behind the blow mould and could extend in this case preferably also in a tangential direction relative to the outer wall of the blow mould 2a.

FIG. 4b shows a detailed view for illustrating the arrest. It can be seen that here again, the engagement members 72 have wedge-shaped surfaces 72a (cf. FIG. 4c), which cause an arrest of the blow mould. Correspondingly, the blow mould includes a recess 75, into which the engagement members 72 can engage. It is to be noted here that the engagement members 72 can be moved in two directions X in order to cause an arrest and also a release of this arrest. What can further be seen here is an arresting member 76 that is used for arresting the mould shell 4a relative to the mould carrier 9.

Figure 5A:
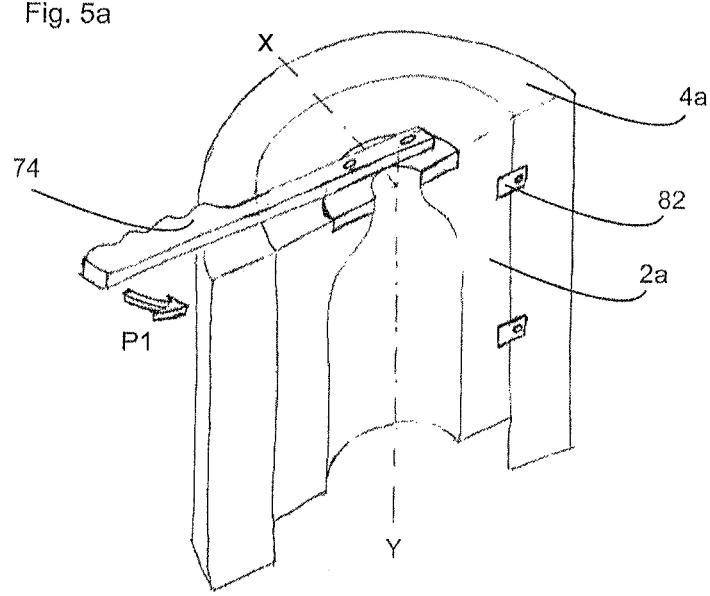

FIGS. 5a-5f show a further embodiment of a blow mould assembly according to the invention. FIG. 5a in turn shows a very schematic view of a blow mould half 2a that is disposed in a blow mould shell 4a. Reference numeral 82 again relates to arresting projections which are however arranged here in a fixed manner and on which the blow mould 2a rests with the right-hand half thereof. Reference numeral 74 relates to a lever that can be applied to the blow mould 2a, by means of which the blow mould can be pivoted out of the blow mould shell 4a or the mould carrier 4a along the arrow P1.

FIG. 5b again shows an arresting mechanism in order to arrest the blow mould 2a relative to the blow mould shell or the master mould 4. This locking mechanism 80 is here provided in a recess 83 of the blow mould shell and a corresponding counter-piece is firmly connected to the blow mould 2a. More specifically, this counter-piece includes a carrier 84 that is mounted on the blow mould 2a by a screw connection 81.

Figure 5B:
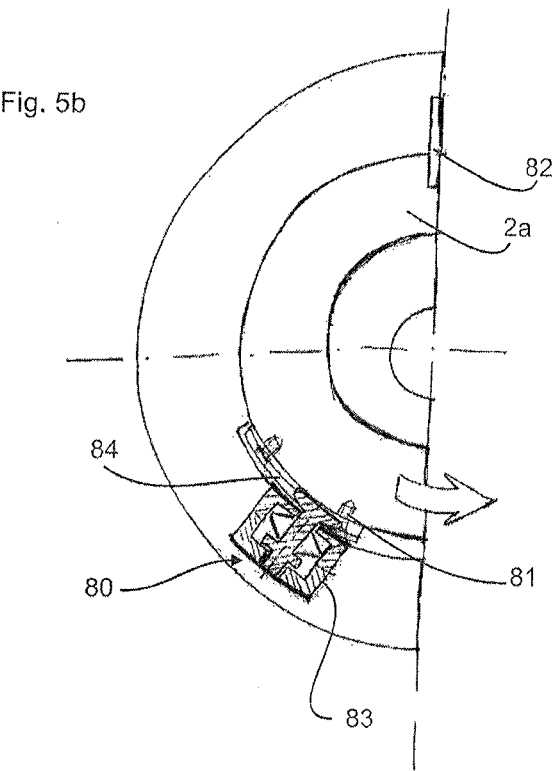

FIG. 5c shows a detailed view of the locking mechanism 80 shown in FIG. 5b. This arresting mechanism 80 has here two arresting heads 86a and 86b which can be displaced in a radial direction R. A spring member 85, which is disposed in a recess 94, resets each of the two arresting heads 86a and 86b. These arresting heads 86a and 86b include here respectively sloping surfaces 87, between which a tongue 88, which in turn is provided on the blow mould, can slide.

When turning the blow mould 2 into the blow mould shell 4, the tongue 88 shown in detail in FIGS. 5e and 5f is pushed in between the two heads 86a and 86b, these are briefly tensioned against the force of the spring 85 and subsequently arrest the tongue 88 and thus also the blow mould 2. FIG. 5d shows a further perspective view for illustrating the arresting mechanism. FIG. 5e shows a position of the tongue 88 relative to the two arresting heads 86a and 86b in an arrested condition. It can be seen that the tongue 88 has a recess 88b, into which these two heads 86a and 86b engage. In this way, an arresting of the blow mould relative to the mould carrier is achieved. The tongue 88 is fixedly mounted to the blow mould 2 through bores 96. In order to withdraw the tongue, it is pulled along the arrow P1 and in this way the two heads 86a and 86b are lifted and the arrest in turn is released in this way.

Thus, in the embodiment shown in FIGS. 5a-5f, the two heads 86a and 86b together constitute the actuating member mentioned in the beginning, which rests in a locked condition of the blow mould assembly on a section of a part of the blow mould 2, which section is here the tongue 88. As a result of the lifting operation, the two heads 86a and 86b are also displaced along a specified axis. However, the tongue 88 is here also the actuating member in order to release the arrest between the mould holder element 4 and the blow mould unit 2, wherein in particular a movement of the heads 86a, 86b is coupled to a movement of the tongue 88 and/or a movement of the tongue entails also a movement of the heads 86a, 86b. Thus, in this embodiment, the actuating member is also a component of the blow mould, and as a result of a movement of the blow mould, also the tongue 88 disposed thereon will be moved.

However, it would also be possible that conversely the heads 86a and 86b are disposed on the blow mould and the tongue 88 is disposed on the mould holder element 4.

FIGS. 6a to 6d show a further embodiment of the present invention. In this embodiment, too, an engagement member 12 is provided, which arrests the blow mould 2a relative to a blow mould shell 4. To this end, the engagement member 12 includes a hook-like end section that engages in a projection 104 provided in the blow mould 2a.

In this connection, the engagement member 12 can be pivoted here about an axis X. The actuating member 14 is accessible to a user, more specifically to the hand of a user, so that the blow mould 2a can be released in this way. In particular in FIG. 6c a recess 106 can be seen that is provided in the blow mould shell 4 and into which the user can manually engage. In the embodiment shown in FIGS. 6a-6d it would also be possible for several such engagement members to be arranged one after the other in the longitudinal direction L. Also, these engagement members 12 could be coupled to each other by means of a longitudinal lever (not shown).

It can further be seen that in this embodiment, the blow mould is hooked into the blow mould shell 4 on just one side, here on the right-hand side. To this end, the blow mould shell 4 has projections 107 which engage in a corresponding recess of the blow mould 2a. In this embodiment, too, the blow mould 2a can initially be hooked into the blow mould shell 4 and can subsequently be arrested by means of the engagement member 12. The projections will in this case not protrude out of the plane of the blow mould.

Figure 7A:
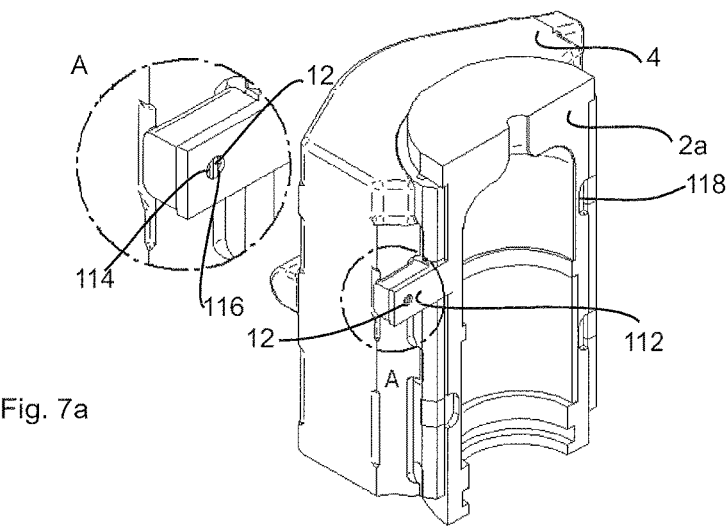
FIGS. 7a-7c show a sixth embodiment of a blow mould assembly according to the invention.
Figure 7B:
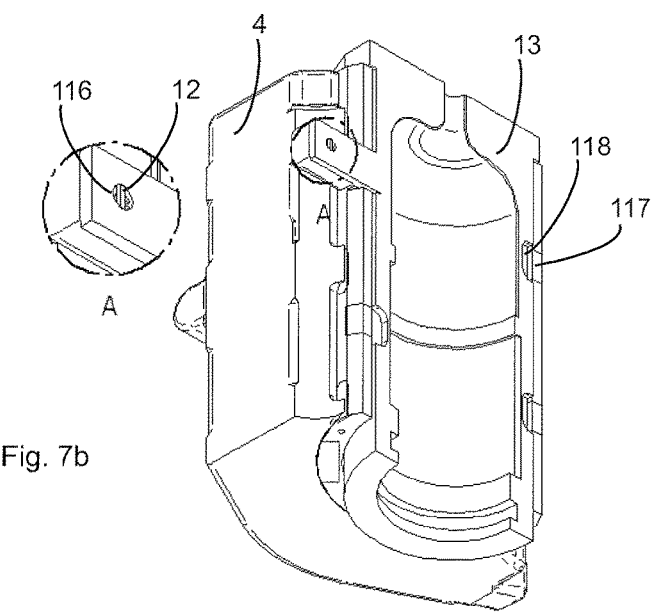
Figure 7C:
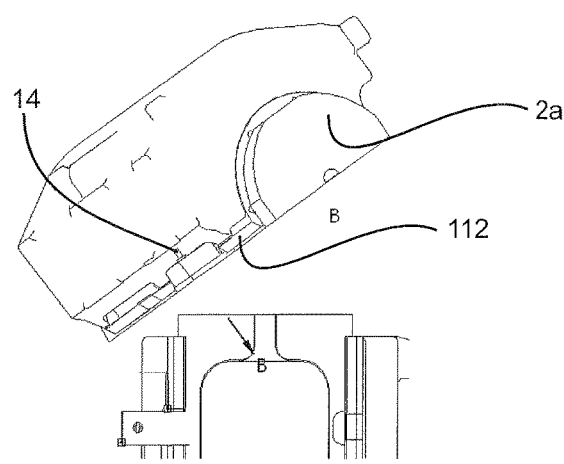
Figure 8A:
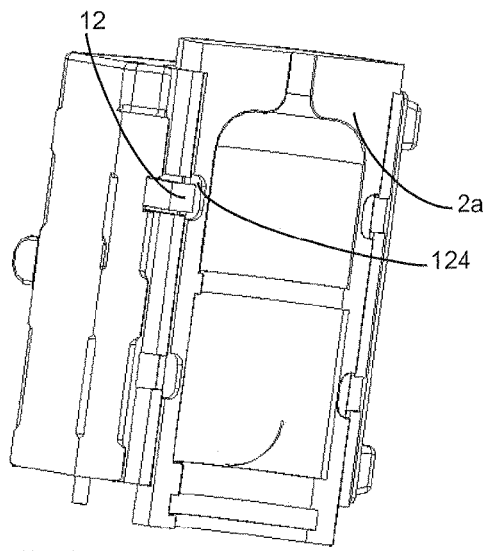
FIGS. 8a-8e show a seventh embodiment of a blow mould assembly according to the invention.
Figure 8B:
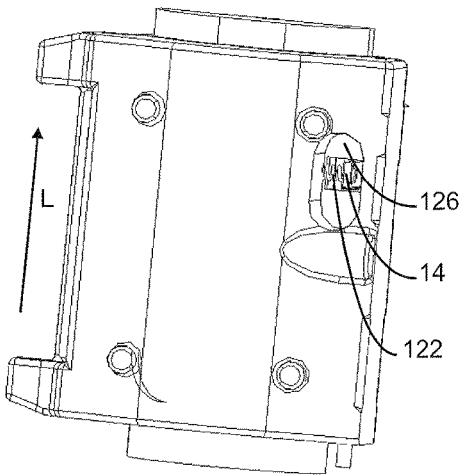
Figure 8C:
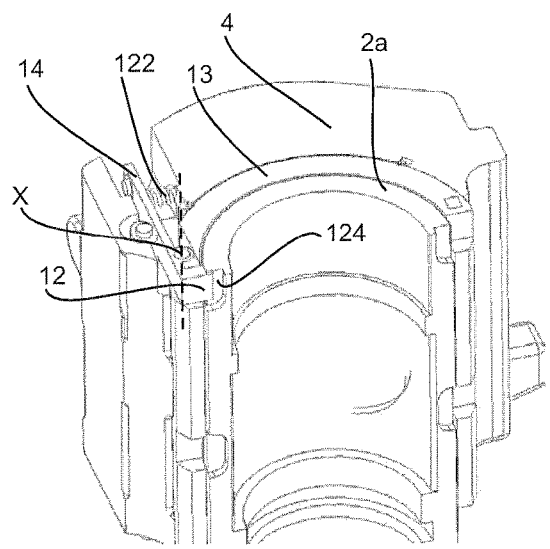
Figure 8D:
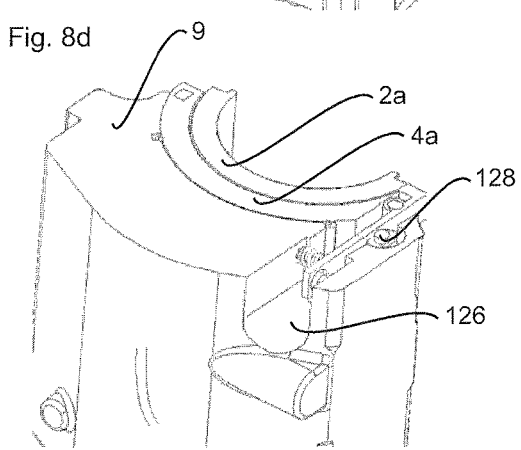
Figure 8E:
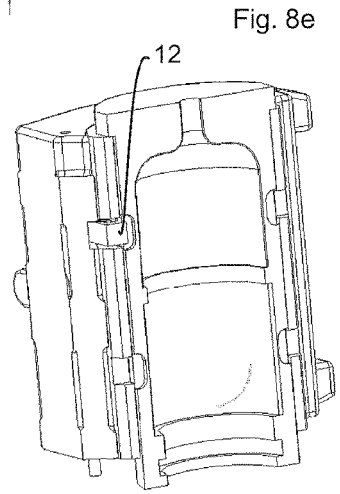
Figure 10A:
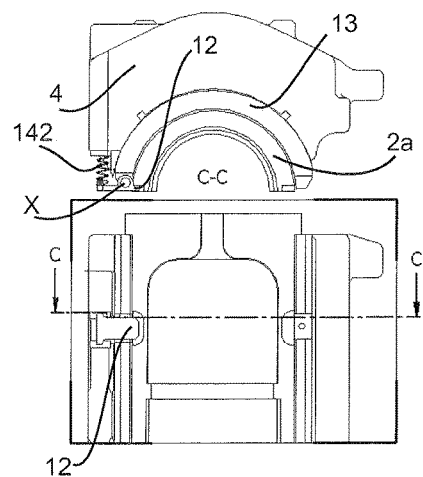
FIGS. 10a-10d show a ninth embodiment of a blow mould assembly according to the invention.
Figure 10B:
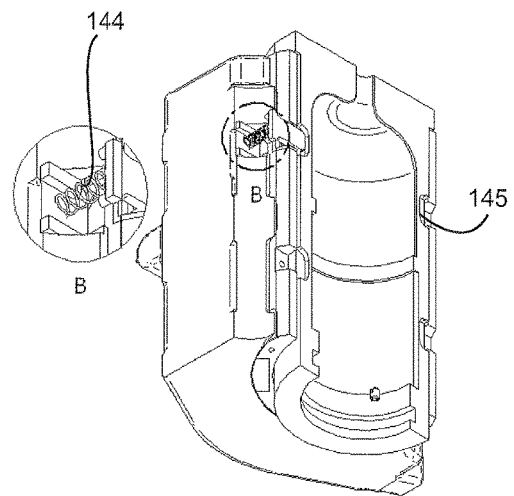
Figure 10C:
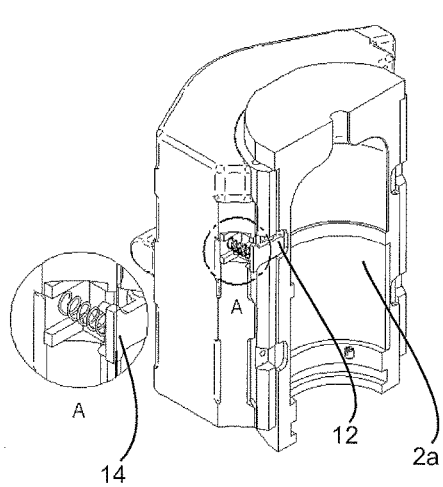
Figure 10D:
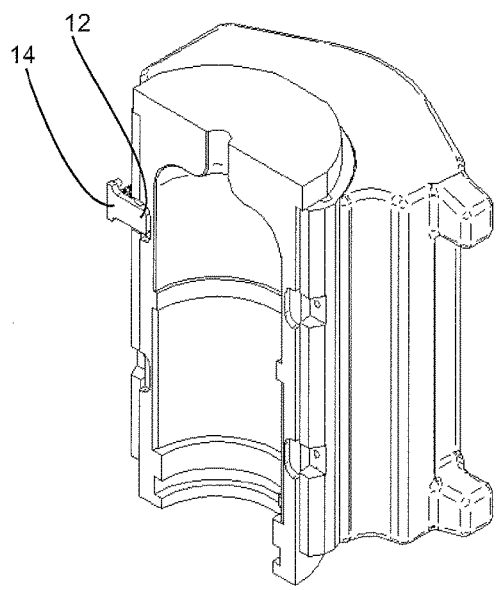

FIGS. 7a-7c show a further embodiment of the present invention. In this embodiment, a projection 112 extending in a radial direction is disposed on the blow mould 2a, which projection is used for arresting the blow mould 2a on the blow mould shell 4. In the enlarged area A of the illustration, an engagement member 12 is again provided which in an arrested condition is located in a recess 114 of the projection 112. In order to release this engagement member 12, it can be turned by 90° so that it can be guided in this way through a recess 116 in order to release in this way the blow mould 2a from the mould shell 4.

FIG. 7b shows another perspective view of the apparatus according to FIG. 7a. Here, too, the engagement member can be seen in an arrested condition. It can further be seen that also in the view shown in FIGS. 7a-7b, the blow mould is hooked in on the right-hand side and that the arrest occurs only on the left-hand side. On the right-hand side of the blow mould, permanently existing projections 117 are again provided which engage in a corresponding recess 118 of the blow mould.

FIGS. 7a-7c show the arrest of a master mould 13 in a blow mould shell 9. Correspondingly, however, it would also be possible to dispose a blow mould on a master mould and also a blow mould on a blow mould shell. By means of the projection 112, an extended lever arm can be obtained and in this way the two elements can be fixed to each other more firmly.

FIGS. 8a-8e show a further embodiment which however only enables the arrangement of a total of three elements relative to each other. More specifically, to this end a blow mould 2a is disposed via a master mould 13 on a blow mould shell 4. Further, an engagement member 12 is again provided which is on the one hand mounted to be pivotable on the blow mould shell 4 and on the other hand engages in a recess 124 of the blow mould 2a. This engagement member is here pretensioned by means of a spring unit 122 in such a way that it engages in said recess 124. This engagement member also includes a manually operated actuating member 14 (cf. FIG. 8c) and this actuating member 14 in turn is located in a recess 126 of the blow mould shell 4. Reference numeral 128 identifies a stop that limits the movement of the locking member 14.

In the same way, however, the apparatus could also be disposed for example on a blow mould carrier and it would also be possible to arrange in this way only two elements relative to each other. The engagement member 12 in turn can include sloping surfaces (not shown) which pretension the blow mould members 2 in the direction of the respective carrier element.

It can be seen that the blow mould 2a protrudes here in the longitudinal direction L beyond the master mould or the blow mould shell. This arrangement facilitates the removal of the blow mould 2a from the master mould 13 or the blow mould shell 4.

It can be seen that the engagement member does not protrude here beyond the respective recess 124 either. Therefore, a closing of the shown blow mould half 2a with a corresponding counter-half 2b in an arrested condition is possible here as well. In contrast, in a closed condition of the entire blow mould, the engagement member 12 cannot be operated via the actuating member 14.

In this connection, in the embodiment shown in FIGS. 8a-8e, the engagement member 12 can also be pivoted, more specifically pivoted in relation to an axis X.

FIGS. 9a-9c show a further embodiment of the apparatus according to the invention. This embodiment is here similar to the embodiment shown in FIGS. 8a-8e, but the stop 128 is absent here. It can be seen that in the embodiments shown in FIGS. 8 and 9, the engagement member is pivoted about an axis that extends parallel to the longitudinal direction of the blow mould, however, the engagement member primarily engages in a radial direction into the corresponding recess of the blow mould 2a.

FIGS. 10a-10d show a further embodiment of the apparatus according to the invention. In this embodiment, an engagement member 12 is also provided which is mounted to be pivotable about a pivot axis X which in FIG. 10a extends vertically relative to the figure axis, and here too, a spring member 142 is provided which pretensions the engagement member 12 in such a way that the blow mould 2a is disposed on the blow mould shell 4. In this embodiment, this pivot axis is disposed to be fixed in relation to the mould shell 4 and also in relation to the master mould 13 and this master mould 13 may also be mounted to be fixed in relation to the mould shell 4. In the embodiment shown in FIGS. 10a-10d, the engagement member is also pivoted, however, an end section of the engagement member is essentially tangentially moved relative to the blow mould. The user can push here against the actuating member 14, in order to release the blow mould 2a in this way from its master mould or from the mould shell. The blow mould 2a again includes recesses 145, into which the engagement member 12 or engagement members arranged to be stationary (in particular on the opposite side in relation to the blow mould) can engage.

Figure 11A:
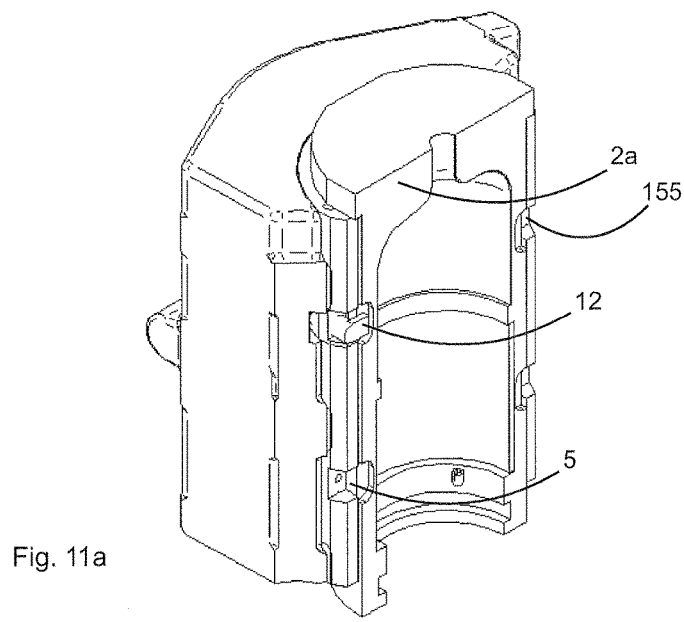
FIGS. 11a-11c show a tenth embodiment of a blow mould assembly according to the invention.
Figure 11B:
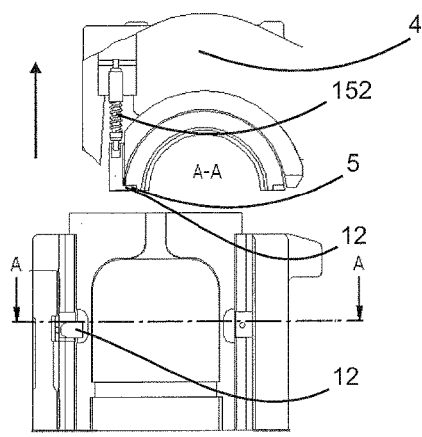
Figure 11C:
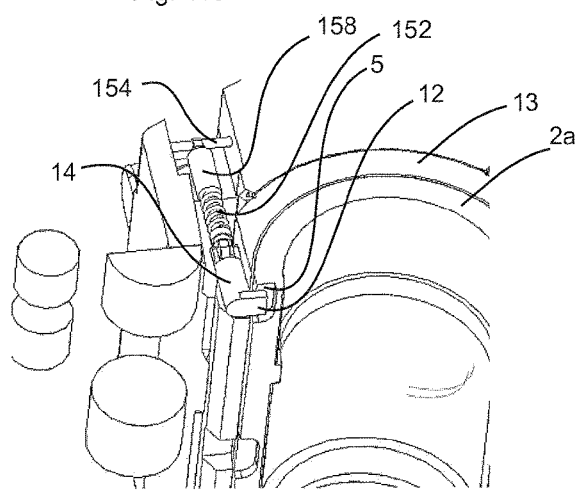

FIGS. 11a-11c show a further embodiment of the present invention. This embodiment is comparable with the embodiment shown in FIGS. 10a-10c, however, a movement of the engagement member 12 is here not a pivoting movement, but a translational movement in a direction T which extends tangentially to the blow mould 2a. In this connection, here too, an actuating member 14 is provided which is in this embodiment implemented in one piece with the engagement member 12.

Based on FIG. 11c, this engagement member 14 can be pulled manually in order to release the blow mould. The arresting means, the arresting mechanism is here hooked onto a pin 154 and the spring member 152 pulls the engagement member 12 in the direction T and thus fastens the blow mould member 2a on the master mould 13 as well as the blow mould shell 4 thereof. In this embodiment, too, several of these engagement members 12 could be provided in the longitudinal direction. Said engagement members could be provided on the right-hand side, however, it would also be possible for the blow mould to be merely hooked in here, so that in this way permanent projections engage in the respective recesses 155 of the blow mould 2a. Reference numeral 158 identifies an adjustment body in order to adjust the spring force acting on the engagement member.

Further, with this embodiment it would be possible for the engagement member 12 to be actuated by pneumatic means, and in this way the blow mould element 2a could be both released and arrested.

FIGS. 12a-12d show a further embodiment of the apparatus according to the invention. In this embodiment, as in the embodiment shown in FIGS. 7a-7c, a projection 162 is provided which is used to arrest the blow mould 2a.

In contrast to the embodiment shown in FIGS. 7a-7c, however, the engagement member 12 is here designed as a round head that can be moved into the projection 162 through a recess or a hole 164. As a result of this movement, as shown in FIG. 12a, an arrest of the blow mould element can be achieved. It would thus be possible, for example, for the engagement member 12 to be displaced together with the engagement member 14 in a direction A (cf. FIG. 12d) in order to achieve an arrest in this way. A corresponding recess 164 has a larger extension, at least in an extension direction (A), than a pin 165 that connects the engagement member 12 to the actuating member 14. More specifically, the engagement member 12 is here integrally connected to the actuating member 14 via the pin 165.

FIGS. 13a-13d show a further embodiment for a lock according to the invention. In this embodiment, as can best be seen in FIG. 13c, a bore extending in the longitudinal direction L is provided in the blow mould member 2a, through which a rod body 184 can be inserted. At the same time, a horizontally extending projection 186 is provided on the blow mould shell 4, which in turn extends through a recess that is provided both in the blow mould 2a and in the master mould 13.

This projection 186 has a hole or an opening 183 through which the rod 184 extends in a closed condition. Reference numeral 187 relates to a further rod-shaped body extending in the longitudinal direction L, which is here disposed in the master mould 13 and is used for the arrest thereof.

Figure 13A:
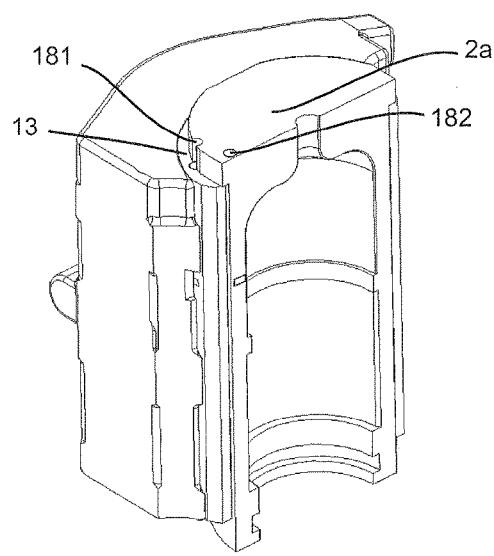
FIGS. 13a-13d show a twelfth embodiment of a blow mould assembly according to the invention.
Figure 13B:
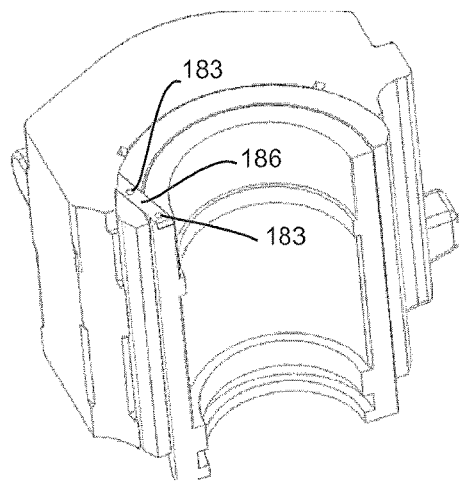
Figure 13C:
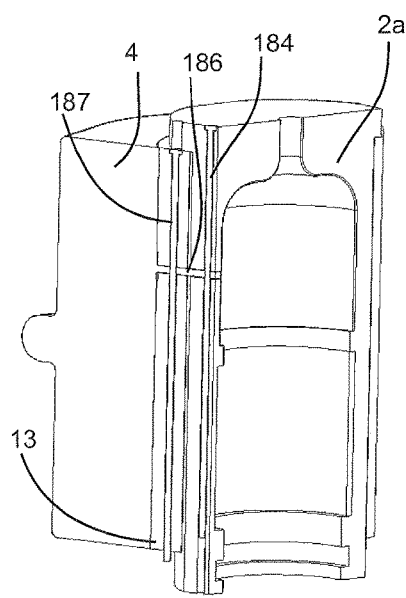
Figure 13D:
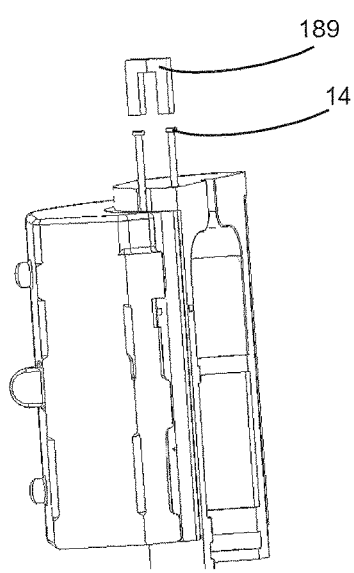

As can be seen in FIG. 13d, the two rods 184 and 187 can be withdrawn by means of a magnet 189 in the longitudinal direction L, in order to release the blow mould 2a. FIG. 13d shows a section at the level of a projection 186, and here too, the two openings or holes 83 for guiding through the two rods 184 and 187 can be clearly seen. It can further be seen that the opening for the rod 187 is partially formed by the blow mould 2a and partially by the master mould 13. Thus, it is possible for an arrest of the blow mould 2a on the master mould 13 to be achieved already by a rod 187 that is inserted into this opening 181, which is partially formed by the blow mould 2a and partially by the master mould 13.

However, also other methods would be conceivable here in order to arrest the rod-shaped body within the apparatus. Thus, these rods 184 and 187 could each have a screw thread at their bottom end, which is screwed into a corresponding mating thread of the blow mould. In this case, however, the rod 184 constitutes the engagement member and a top area, which can here be attracted by a magnet 189, constitutes an actuating member that is formed on one side of the engagement member. For release, however, no pivoting movement is carried out, but a movement along the arrow L, which is here at the same time the longitudinal direction of the apparatus. This means that the rods 187 and 184 could each constitute by themselves the engagement members 12 according to the invention, and the head of each of these rods could form the actuating member 14.

FIGS. 14a-14d show a further embodiment of a lock according to the invention. Also in this embodiment, an engagement member 195 is provided which engages in a recess 197 in the blow mould 2a, in order to fasten the blow mould 2a relative to the blow mould shell 4.

This engagement member 195 is disposed here on the rod 192 in a rotationally fixed manner, and said rod is pivotable along the longitudinal direction L. To this end, a lever 193 is provided on the rod 192. Reference numeral 191 identifies a stop provided on the blow mould shell 4, which delimits a pivoting movement of the rod 192. In this embodiment, no separate spring for tensioning the blow mould 4a is provided.

A certain spring action is here caused by the rod 192 which can be twisted along the direction of its extension. To this end, the lever preferably latches in a position relative to a carrier 199 which causes a certain pretension of the engagement member 195. This fact is illustrated in FIG. 14d. Here, two positions of the rod 192 are shown, namely on the one hand a locking position (continuous lines) and on the other hand a release position (dashed lines). The angle α identifies the angle about which the rod is twisted between the lever 193 and the engagement member 195, so that the blow mould 2a is reliably clamped.

Reference numeral 194 relates to a support for supporting the rod 192. Preferably, at least one further such support (not shown) is provided here. Such a support could also be designed in such a way that the rod cannot be displaced relative to the support 194 in the longitudinal direction thereof.

It would also be possible to provide an internal thread in the support 194, which interacts with a corresponding external thread in the rod 192. In this case, a lifting cylinder (not shown), such as for example a pneumatic cylinder, could be provided, which displaces the rod 192 in the longitudinal direction and effects in this way also a pivoting movement of said rod. In this case, the rod 192 would preferably be rotatable in relation to said pneumatic cylinder. Said thread of the support 194 could preferably be a high-helix thread.

Figure 14A:
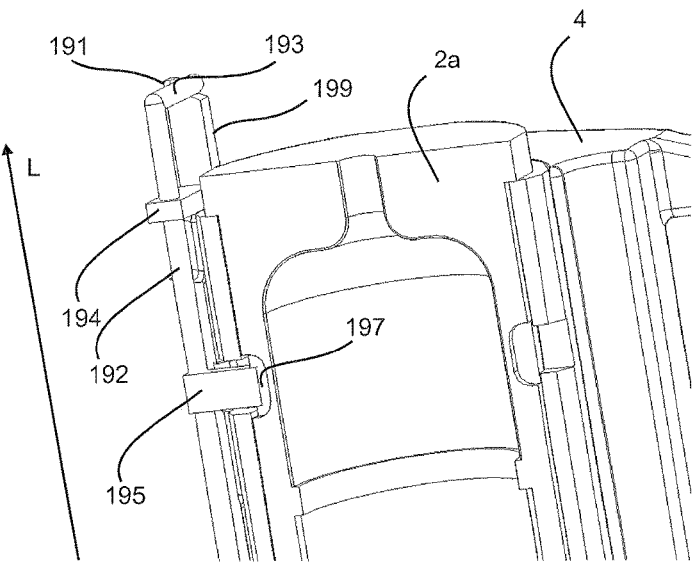
FIGS. 14a-14d show a thirteenth embodiment of a blow mould assembly according to the invention.
Figure 14B:
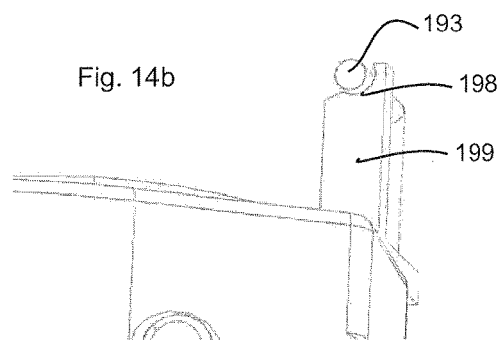
Figure 14C:
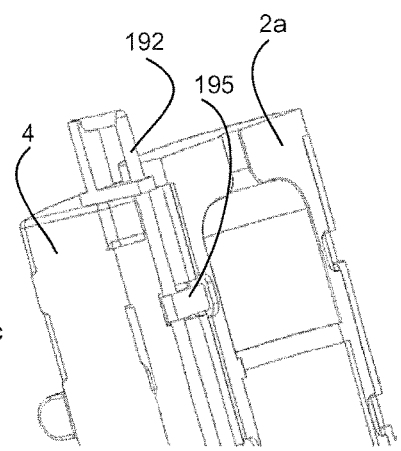
Figure 14D:
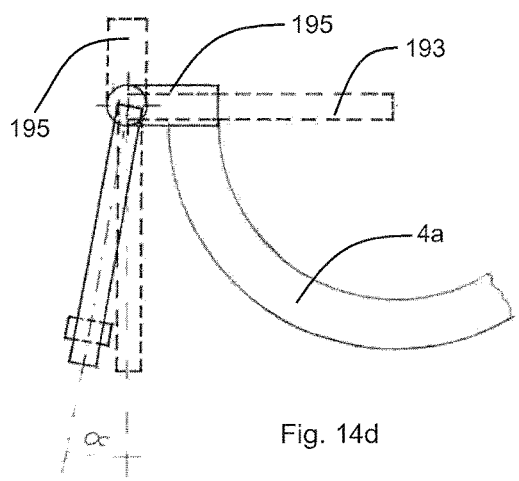

The illustration shown in FIG. 14b additionally shows a recess 198, in which the rod 192 can latch.

Figure 15:
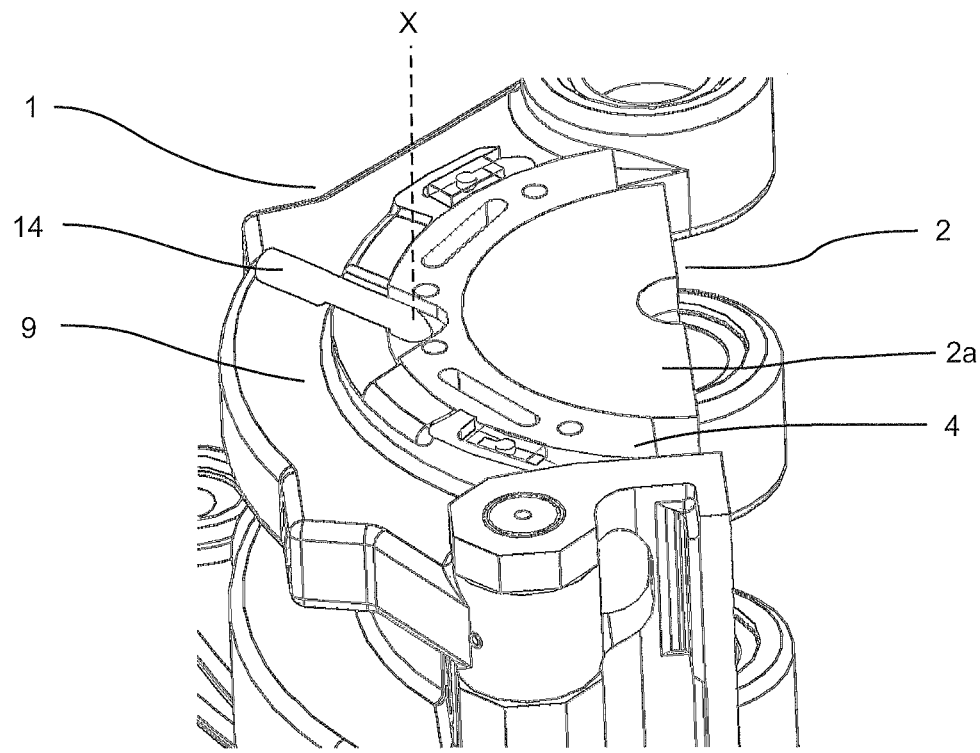
FIGS. 15a-15c show a further embodiment of a blow mould assembly according to the invention.
Figure 15:
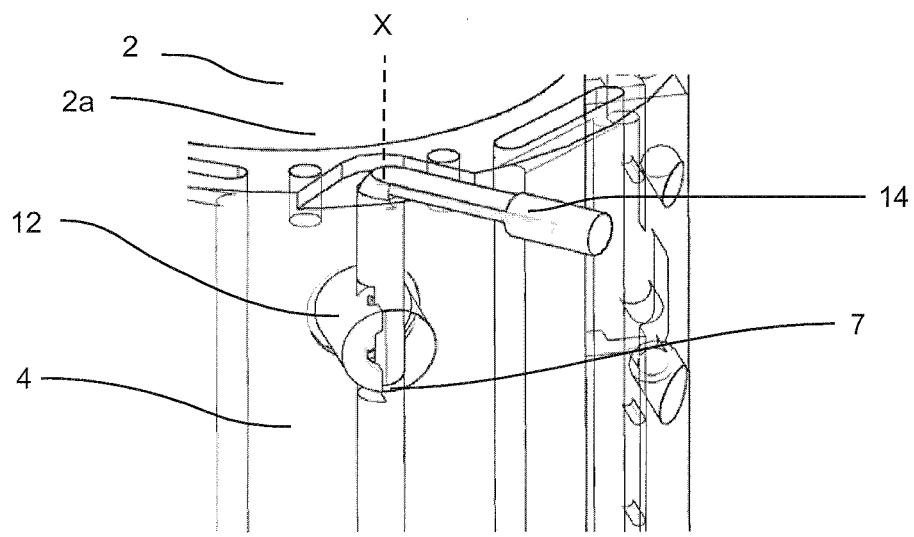
Figure 15:
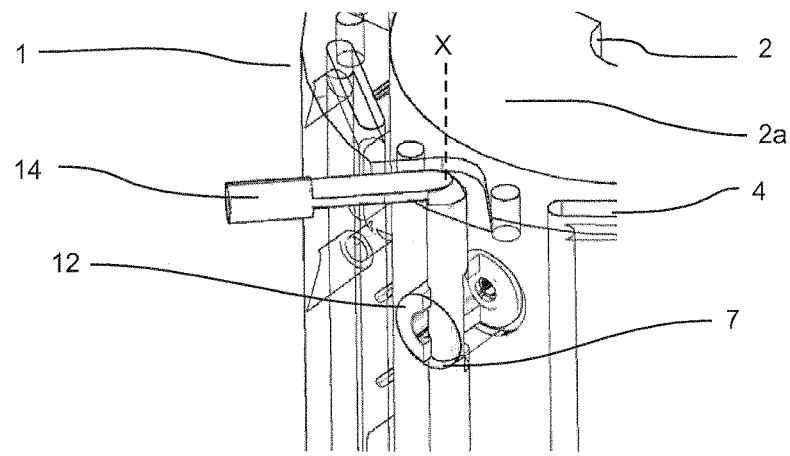

FIG. 15a shows a further embodiment of the blow mould assembly 1 according to the invention, wherein the blow mould 2 can be replaced without the use of an additional tool. Both blow mould halves 2a can respectively be unlocked by means of a manual actuating member 14, which is mounted so as to be pivotable about the axis X from an opening position as shown in FIG. 15b to a closing position as shown in FIG. 15c and has a rod-shaped body having an eccentric cross-sectional profile or an eccentric recess 7.

The blow mould 2 is here equipped with one or more pin-shaped engagement members 12, which are attached to the cylindrical external wall of the blow mould 2 so as to be radially projecting therefrom. Each of these engagement members 12 respectively engages radially in a cylindrical bore of the blow mould shell 4 and prevents in this way a twisting of the blow mould 2. By means of the actuating member 14, which is located in a bore of the blow mould 4 in a manner so as to be rotatable or pivotable about the axis X and penetrates into the engagement member 12, the blow mould 2 can, as a result of a pivoting action of the actuating member 14 about the axis X, be clamped or arrested in the blow mould shell 4 due to the eccentricity in the recess 7. In this way, the mould can be unlocked also in the case of a closed mould carrier 9, and a plurality of engagement members 12 may be attached for each blow mould half 2a (one after the other in the direction of the axis X), which can respectively be clamped or arrested with just one single actuating member 14.

Figure 16:
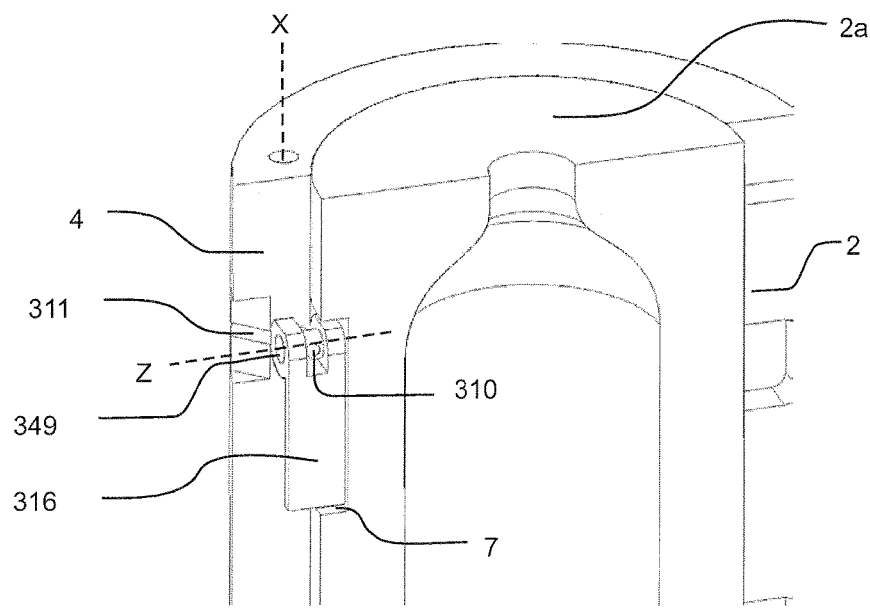
FIGS. 16a-16f show a further embodiment of a blow mould assembly according to the invention.
Figure 16:
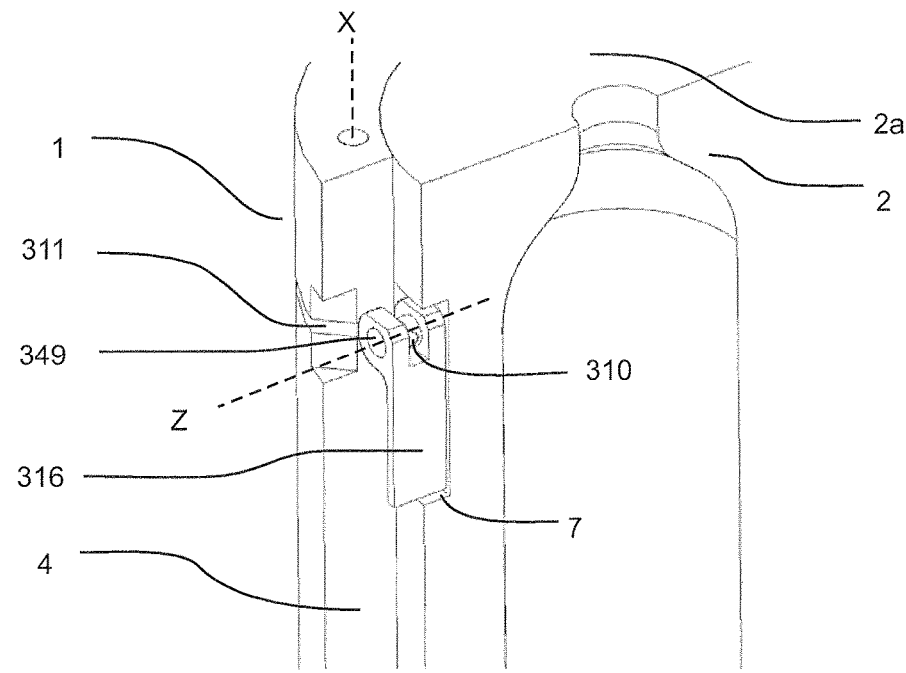
Figure 16:
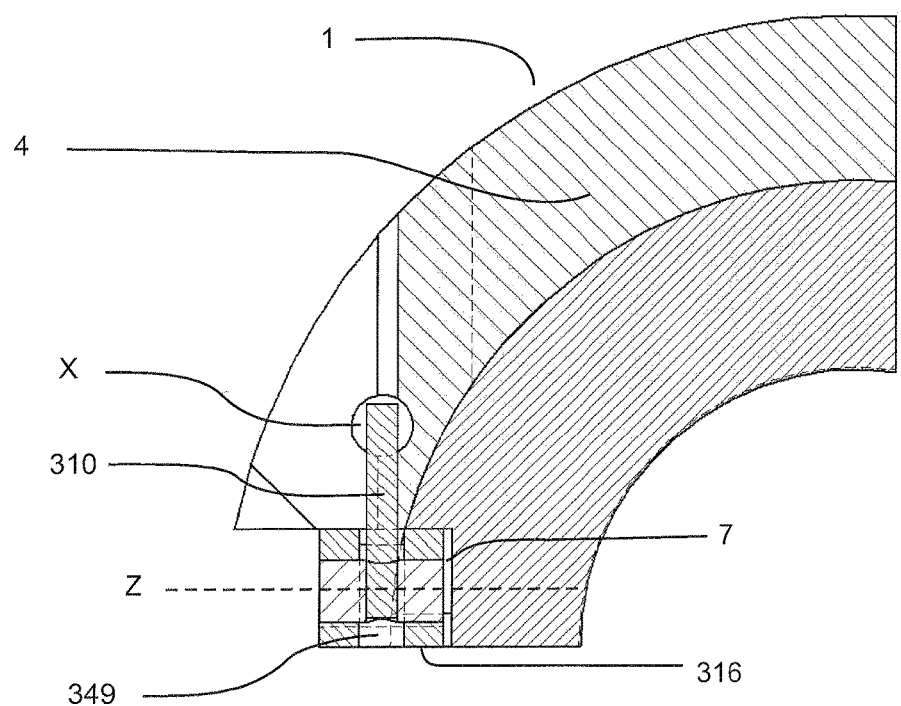
Figure 16:
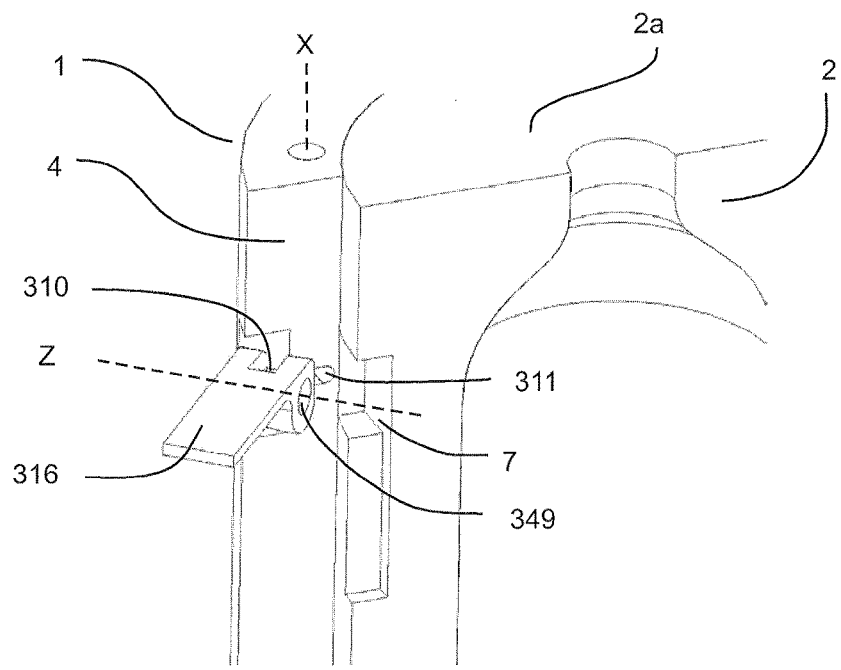
Figure 16:
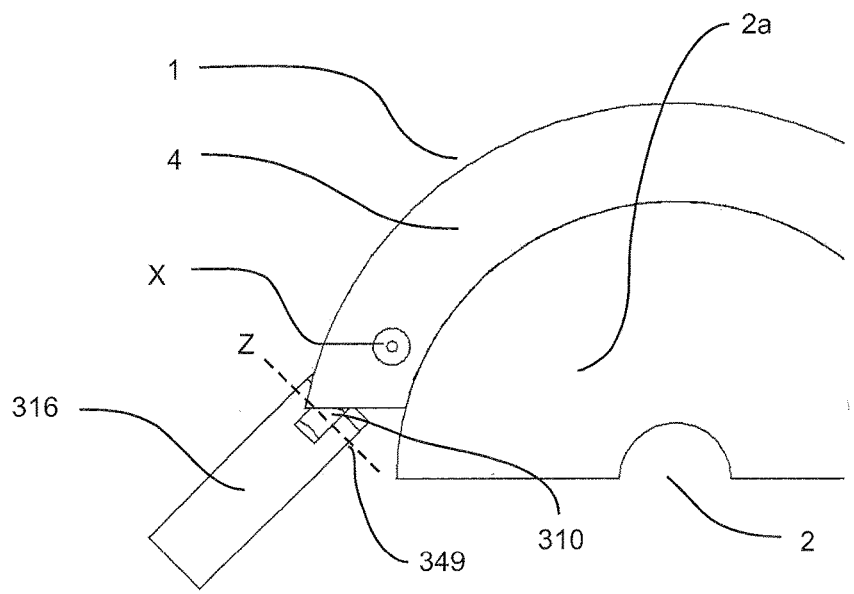
Figure 16:
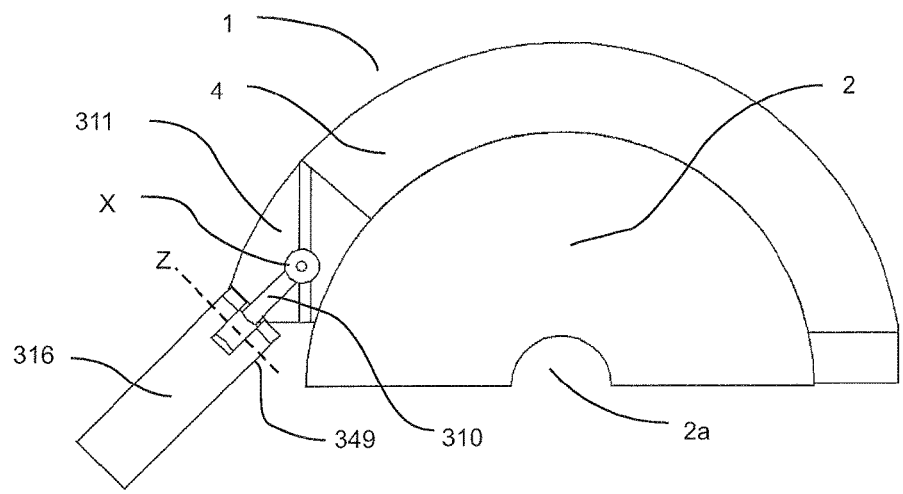

FIG. 16a shows a further embodiment of the blow mould assembly 1 according to the invention, wherein each blow mould shell 2a can be replaced without the use of an additional tool by means of an eccentric quick clamping member 316. FIG. 16b shows a further perspective view of this blow mould assembly 1. The eccentric quick clamping member 316 is disposed flush in a recess 7 of the blow mould 2 or of the blow mould half 2a, so that a second blow mould half 2a can be positioned flush against it and the entire blow mould assembly 1 can be closed.

FIG. 16c shows that for a mechanical arrest of the blow mould half 2a relative to the blow mould shell 4, the eccentric quick clamping member 316 is provided with a pin 349 and a tension rod 310 that is pivotably connected to an axis or shaft X of the blow mould shell 4.

The eccentric quick clamping member 316 is implemented to be movable about the Z axis and can be folded up about the Z axis for disassembly or unlocking of the blow mould from a vertical closing position to a horizontal opening position (FIG. 16d). In order to allow the blow mould to be released for replacement, the eccentric quick clamping member 316 can be pivoted about an X axis as shown in FIG. 16a. To this end, the blow mould half 2a is provided with a horizontal cut-out 311. FIG. 16f shows the position of the tension rod 310 in a horizontal section through the cut-out 311, which tension rod is connected to the Z axis of the eccentric quick clamping member 316 as well as to the X axis in the blow mould shell 4 by means of the pin 349.

Figure 17:
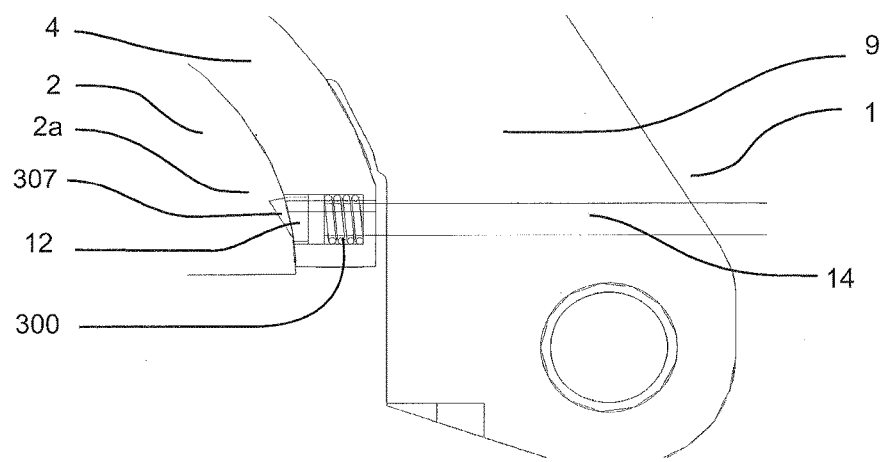
FIG. 17 shows a further embodiment of a blow mould assembly according to the invention.

FIG. 17 shows a further embodiment of the blow mould assembly 1 according to the invention, wherein the blow mould 2 can be replaced without the use of an additional tool, with reference numeral 9 identifying the mould carrier. The blow mould 2 is secured or arrested against twisting or displacement about the vertical axis in relation to the blow mould shell 4 by means of an engagement member 12. This engagement member automatically engages in a recess 307 of the blow mould 2 by means of a spring member 300. During assembly of the mould, the mould is initially pushed into the mould shell, in the course of which the engagement member 12 is pushed back against the reset force of the spring member. As soon as the blow mould 2 is correctly aligned in the blow mould shell 4, the engagement member 12 can subsequently engage in the recess 307 as a result of the spring force and can arrest the blow mould 2 against twisting or displacement relative to the blow mould shell 4. The engagement member 12 can be pulled back by means of a manual actuating member 14, so that the blow mould 2 can be released from the blow mould shell 4. It would also be conceivable for the engagement member to be positioned with the reset spring in the blow mould and for a recess to be formed on the opposite side, the contact surface of which can be switched away in a manner similar to an electric door opener (variant not shown).

Figure 18:
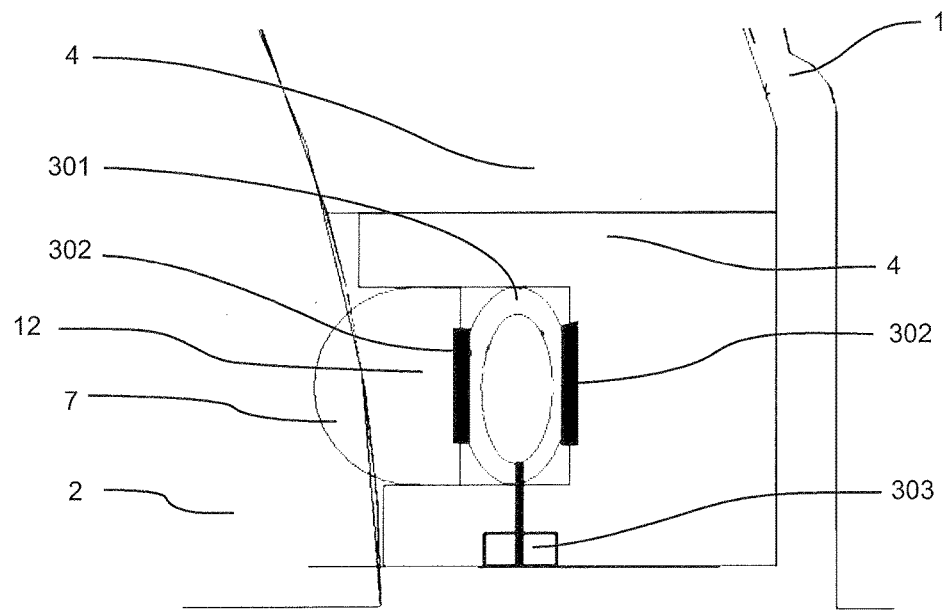
FIG. 18 shows a further embodiment of a blow mould assembly according to the invention.

FIG. 18 shows a further embodiment of the blow mould assembly 1 according to the invention, wherein the blow mould 2 can be replaced without the use of an additional tool. The blow mould 2 is here also arrested or secured against twisting about the vertical axis or against displacement by means of an engagement member 12. The engagement member 12 engages in the recess 7 on the cylindrical outer wall of the blow mould 2 and is driven or actuated by means of a pressure member 301, such as e.g. a pressure hose or a pressure cylinder.

The pressure member 301 is supplied with pressurised air via a valve 303 that can be selectively opened or closed. In order to replace the blow mould 2, the pressure in the pressure member 301 can be released via the valve 303, so that the pressure on engagement member 12 relative to the blow mould shell 4 is released and the blow mould 2 can thus be removed. In order to enable a complete reset of the engagement member 12, the pressure member 301 can be mechanically, such as e.g. by adhesion 302, connected to the engagement member 12, so that the pressure member 301 can automatically reset the engagement member 12 in the case of a pressure release or by means of a negative pressure from the recess 7 in the blow mould shell 4.

In an alternative embodiment, the blow mould assembly 1 according to the invention may be equipped with a spring member that is used to push the engagement member 12 automatically and permanently into the recess 7 of the blow mould 2 by spring force and to arrest it in relation to the blow mould shell 4. For opening, the engagement member 12 can be pushed out of the recess 7 of the blow mould 2 against the spring force of the spring element as a result of a build-up of positive or negative pressure in the pressure member 301, in order to release the lock or arrest.

Figures 19A, 19B:
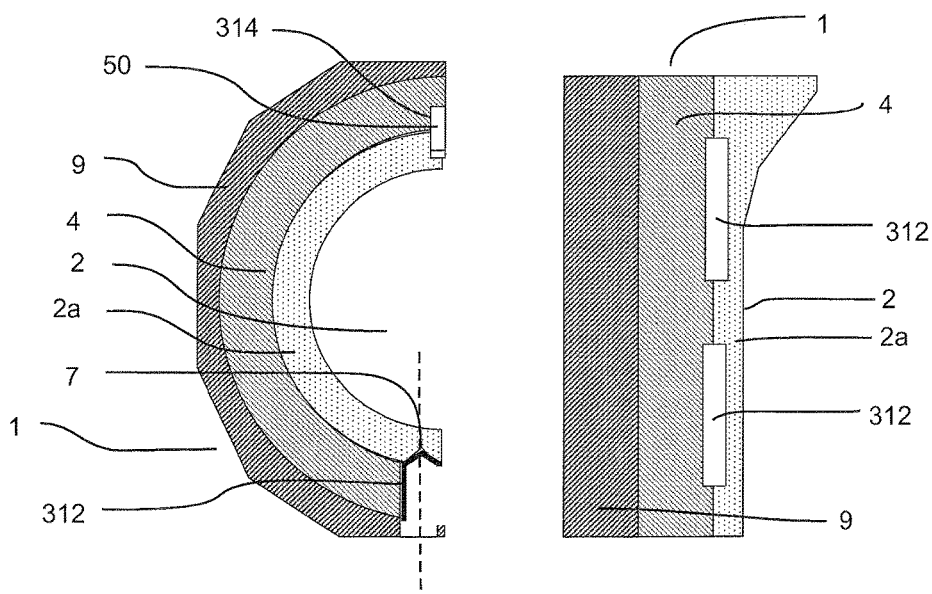
FIGS. 19a-19b show a further embodiment of a blow mould assembly according to the invention.

FIG. 19a shows a further embodiment of the blow mould assembly 1 according to the invention in a mould carrier 9, wherein the blow mould shell 4 is provided on one side with an engagement body 50 that is inserted along the vertical axis into a recess 314 in the blow mould shell 4. The engagement body 50 engages on one side into the blow mould half 2a, thereby fixing the same. During assembly, the blow mould 2 or the blow mould half 2a is brought into contact with one side of the engagement body 50 in the blow mould shell 4 and is turned into the blow mould shell 4. For arresting the blow mould 2, the blow mould shell 4 is equipped with a spring-loaded engagement member 312, which is here formed as a spring plate, and the blow mould 2 is equipped with a recess 7 into which the spring-loaded engagement member 312 can engage.

FIG. 19b shows the radial section through the spring-loaded engagement member 312, which is disposed here along the vertical axis of the blow mould assembly 1 according to the invention between the blow mould 2 or the blow mould half 2a and the blow mould shell 4. In order to release the arrest a tool is needed, so that the blow mould half 2a can be released from the spring plate or from the spring-loaded engagement member 312 and can be withdrawn from the blow mould shell 4. However, it would also be possible for such a tool—which may if needed also be in one piece—to be disposed on the engagement member 312.

Figures 20A, 20B:
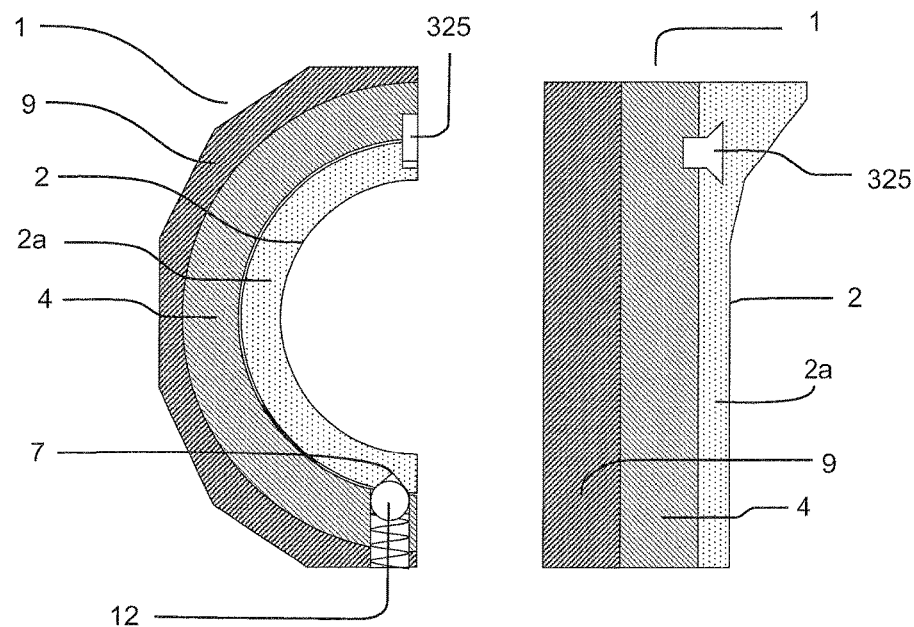
FIGS. 20a-20d show a further embodiment of a blow mould assembly according to the invention.
Figures 20C, 20D:
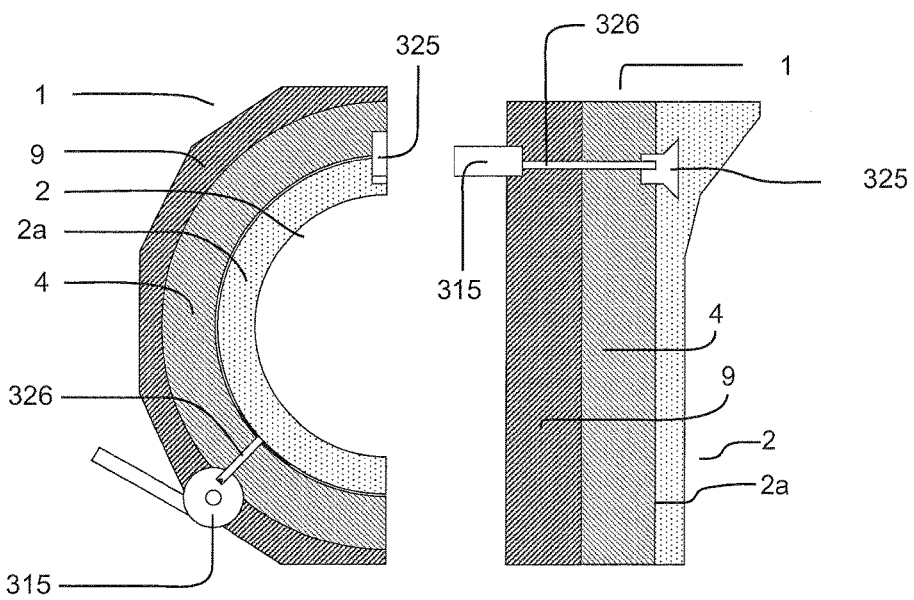

FIG. 20a shows a further embodiment of the blow mould assembly 1 according to the invention in a mould carrier 9, wherein the blow mould 2 can be replaced without the use of an additional tool and wherein the blow mould 2 or the blow mould half 2a is guided on one side by means of a spring groove element 325 in the blow mould shell 4. FIG. 20b shows the radial section through the spring groove element 325, which is disposed between the blow mould 2 or the blow mould half 2a and the blow mould shell 4. The spring groove element 325 secures the blow mould 2 against radial and axial forces. In order to secure it against tangential twisting, the blow mould shell 4 is equipped with a spring-loaded engagement member 12 that is here formed as a spherical spring and that engages in a recess 7 of the blow mould 2. FIG. 20c shows, in an alternative embodiment, a lever-shaped actuating member 315 that presses the blow mould 2 into the blow mould shell 4 or into the mould carrier 9 via a plunger 326 and that is attached for example on the mould carrier 9. In a further embodiment, the lever-shaped actuating member 315 can be mechanically connected to the spring groove element 325 via a plunger 326, so that the lever-shaped actuating member 315 is pressed into the blow mould 2 or into the mould carrier 9 as a result of an actuation, i.e. by a compressive or tractive force. In this connection, the lever-shaped actuating member 315 may be formed in different ways and may be provided for example with latching elements for a stepwise arrest and/or may include an eccentric element, so that the compressive or tractive forces acting on the plunger 326 or the blow mould 2 can be increased (FIG. 20d).

Figures 21A, 21B:
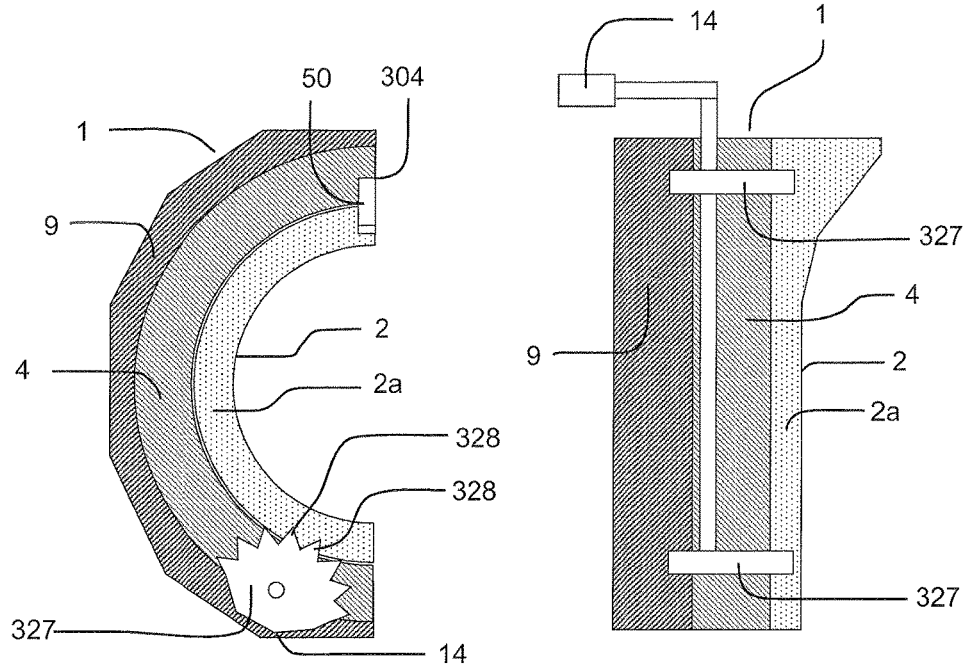
FIGS. 21a-21b show a further embodiment of a blow mould assembly according to the invention.

FIG. 21a shows a further embodiment of the blow mould assembly 1 according to the invention in a mould carrier 9, wherein the blow mould 2 can be replaced without the use of an additional tool. The blow mould shell 4 is provided on one side with an engagement body 50, which is inserted along the vertical axis into a recess 304 in the blow mould shell 4. The engagement body 50 engages on one side in the blow mould half 2a, thereby fixing the latter. During assembly, the blow mould 2 or the blow mould half 2a is placed in contact with one side of the engagement body 50 in the blow mould shell 4 and is turned into the blow mould shell 4. For arresting, the blow mould 2 is pressed into the blow mould shell 4 or into the mould carrier 9 using a gear-shaped engagement member 327. To this end, the blow mould 2 may be provided with several tooth-shaped recesses 328 on the cylinder-shaped outer surface, into which recesses the gear-shaped engagement member 327 can engage. The gear-shaped engagement member 327 may have various embodiments, e.g. the form of a gear with several teeth or with just one tooth. As shown in FIG. 21b, the actuation of the gear-shaped engagement member 327 may be carried out using an engagement member 14 that is guided out of the blow mould assembly 1 via the vertical axis. Several gear-shaped engagement members 327 as well as tooth-shaped recesses 328 may be attached for each blow mould half 2a, which can be actuated or arrested respectively with just one single actuating member 14.

Figures 22A, 22B:
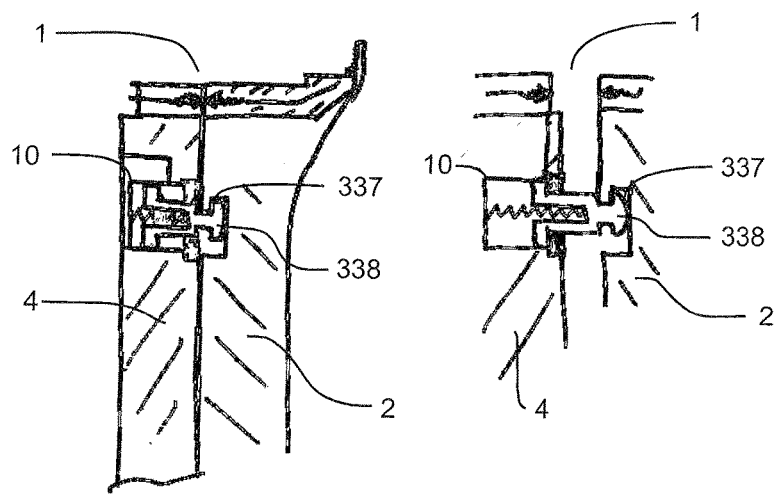
FIGS. 22a-22b show a further embodiment of a blow mould assembly according to the invention.

FIG. 22a shows a further embodiment of the blow mould assembly 1 according to the invention, wherein the blow mould 2 can be replaced without the use of an additional tool and wherein the blow mould 2 is provided with a hook-shaped recess 337 on its cylinder-shaped outer wall, onto which recess the blow mould 2 can be hooked during assembly. The blow mould shell 4 is here equipped with a corresponding locking mechanism 10 and with a hook-shaped engagement member 338, which is actuated or withdrawn either mechanically, pneumatically, hydraulically or electromagnetically, so that the blow mould 2 is pressed against the blow mould shell 4 and can thus, as shown in FIG. 22b, be arrested.

Figure 23A:
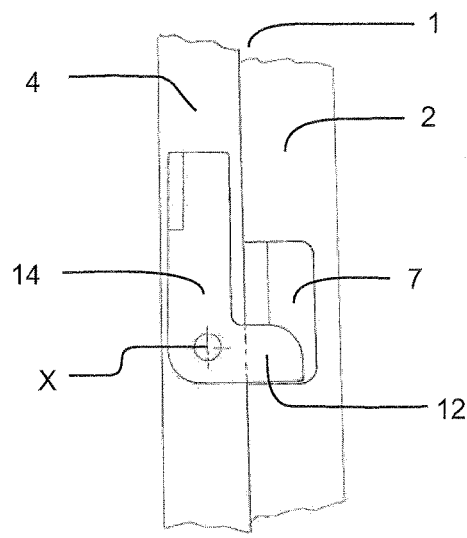
FIGS. 23a-23d show a further embodiment of a blow mould assembly according to the invention.

FIG. 23a shows a further embodiment of a blow mould assembly 1 according to the invention, wherein the blow mould 2 can be replaced without the use of an additional tool. The blow mould 2 is provided with a recess 7, into which an engagement member 12 can engage, so that the blow mould 2 is arrested against twisting and/or displacement about or along the vertical axis relative to the blow mould shell 4. The engagement member 12 is arranged to be rotatable about an axis X and is provided with a lever-shaped actuating member 14.

Figure 23B:
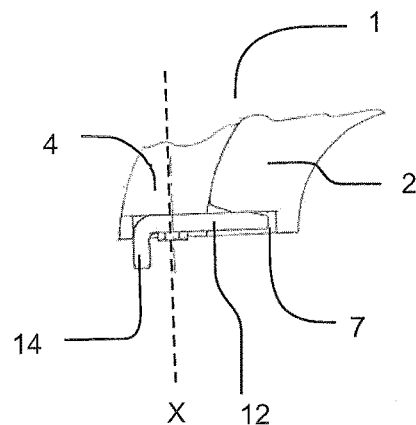
Figure 23C:
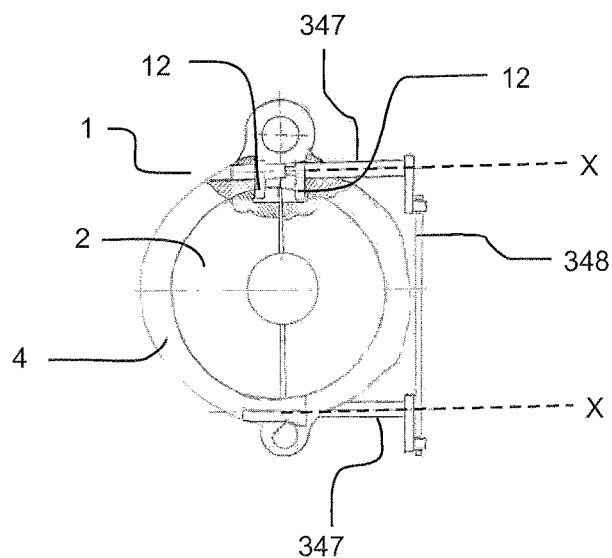

FIG. 23b shows a horizontal section through the blow mould assembly 1 of FIG. 23a, wherein the engagement member 12 arrests the blow mould 2 relative to the blow mould shell 4. FIG. 23c shows further embodiments of the blow mould assembly 1 according to the invention. The blow mould shell 4 is here equipped with a total of four engagement members 12 and the blow mould 2 is equipped with four recesses 7 along the vertical axis, with respectively two engagement members 12 as well as two recesses 7 being positioned horizontally opposite each other.

Figure 23D:
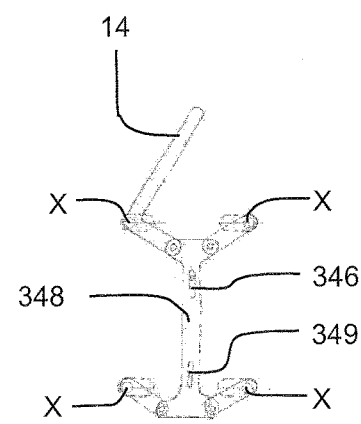

The axes X of the engagement members 12 are guided outwards tangentially along the cylinder-shaped outer wall of the blow mould shell 4 by means of rotary axis elements 347 and are mechanically coupled to each other by means of a connection element 348 (FIG. 23d), so that in the case of a pivoting action of an engagement member 14, all of the four engagement members 12 can be rotated at the same time about their respective rotary axes X and the blow mould 2 can thus be arrested or released. The connection element 348 is movable along the longitudinal axis and has recesses 346 which are engaged by pins 349.

Figure 24A:
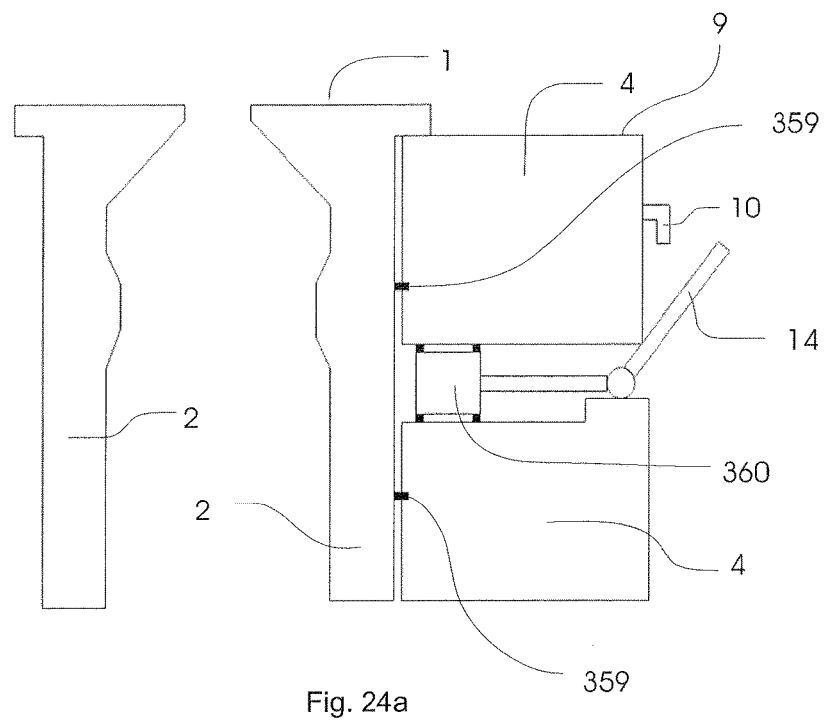
FIGS. 24a-24c show a further embodiment of a blow mould assembly according to the invention.

FIG. 24a shows a further embodiment of the blow mould assembly 1 according to the invention, wherein the blow mould 2 can be replaced without the use of an additional tool and wherein the blow mould 2 is arrested relative to the blow mould shell 4 by means of negative pressure. To this end, the blow mould assembly 1 is provided with sealing elements 359 on the connection surface between the blow mould 2 and the blow mould shell 4 as well as with a vacuum cylinder 360. The vacuum cylinder 360 is provided with an actuating member 14, so that the latter can be withdrawn and negative pressure can be generated. The actuating member 14 is provided with a locking mechanism 10, as a result of which the latter can be arrested and can be fixed to the mould carrier 9. The sealing elements 359 may here be implemented to be elastic, for example in the type of rubber rings. Also the vacuum cylinder 360 can be sealed using sealing means relative to a channel in which it is movable.

Further, it is advantageously provided to attach a centring aid (not shown) in the blow mould assembly 1, in order to align the blow mould 2 or a blow mould part 2a, 2b in an intended working end position automatically towards the blow mould holder during the arrest or during the generation of the negative pressure and the associated suction of the outer surface of the blow mould against the blow mould shell 4 or against the sealing elements 359.

To this end, a conical elevation as well as a corresponding conical recess may be provided, which may be disposed for example either on the outside of the blow mould 2 or on the inside of the blow mould holder 4, for example in the sealing area between the sealing elements 359.

It is to be noted that the centring aid described here may also be used in connection with the other embodiments shown.

Figure 24B:
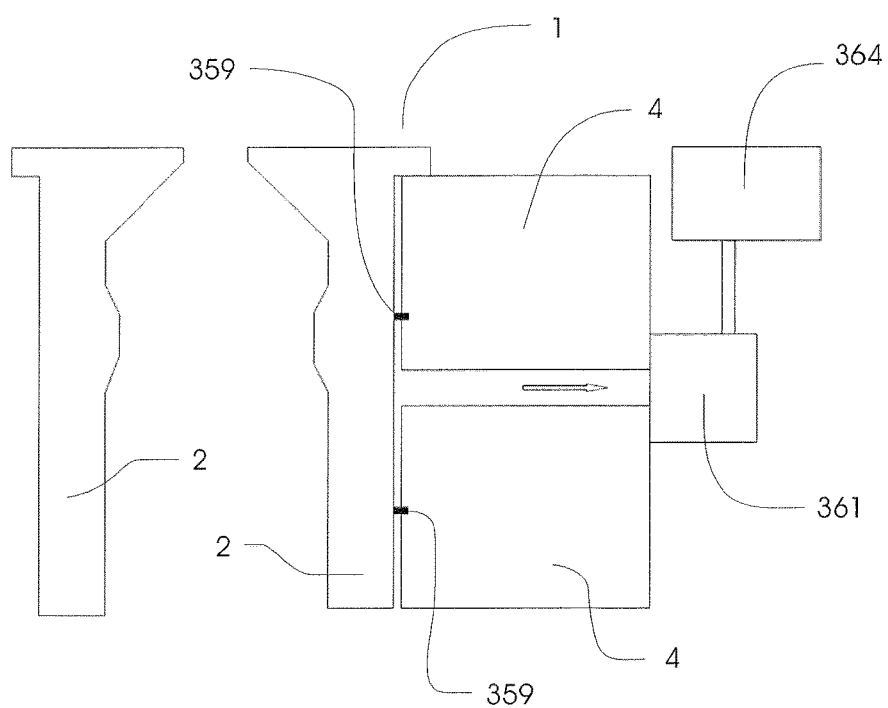

FIG. 24b shows a further embodiment of the blow mould assembly 1 according to the invention. The negative pressure is provided here by means of a Venturi valve 361, through which pressurised air flows, so that negative pressure is generated. The positive pressure for the Venturi valve 361 is provided here for example by means of positive pressure available from a production system 364.

Figure 24C:
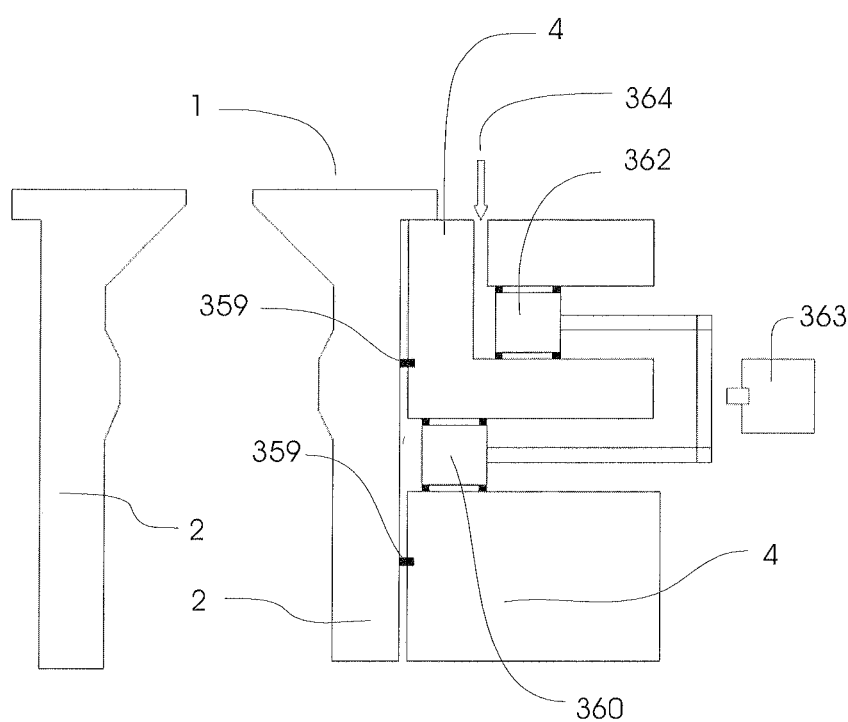

FIG. 24c shows a further embodiment of the blow mould assembly 1 according to the invention, wherein the negative pressure is provided by means of a mechanical coupling of the vacuum cylinder 360 with a further pressure cylinder 362. In this connection, the application of pressure on the pressure cylinder 362 produces a deflection, as a result of which the vacuum cylinder 360 is also deflected, so that a negative pressure is generated between the blow mould 2 and the blow mould shell 4, as a result of which the blow mould 2 is arrested on the blow mould shell 4. By means of a sensor 363, the path deflections of the two cylinders can be detected, and once a maximum path deflection is reached, an alert signal can be output.

In this connection, a non-return valve (not shown) or a pressure-controlled valve (not shown), which is activated for example as a function of the positive or negative pressure present, may be provided in the blow mould assembly in order to ensure the vacuum in the case of a failure of pressurised air or power supply as well as in the case of a failure of the vacuum generation (e.g. in the case of a failure of the pressurised air supply by the production system 364), so that the present suction pressure or the vacuum is contained and can thus be kept constant.

Advantageously, the blow mould assembly also includes a sensor unit for determining pressure between the blow mould unit and the blow mould holder. Using the results of such a pressure measurement, a corresponding negative pressure could be controlled, but if necessary, such as if the pressure increases too abruptly, the machine on which the blow mould assembly is located could also be stopped.

However, it would also be possible to provide vacuum sources such as for example vacuum pumps. Thus, a vacuum pump could also actuate several blow mould assemblies at the same time.

It is noted that the embodiments described above can also be combined with each other. Also apparatus are conceivable which are comprised of different features of the embodiments shown in the individual figures.

All of the features disclosed in the application documents are claimed as being essential to the invention in as far as they are novel over the prior either individually or in combination.

LIST OF REFERENCE NUMERALS

1 Blow mould assembly
2 Blow mould
2a Part of a blow mould 2/blow mould
4 Blow mould shell
4a Half of a blow mould shell 4/mould carrier/master mould
7 Recess
8 Cavity
9 Mould carrier
10 Locking mechanism
11 Bottom area of the blow mould shell
12 Engagement member
13 Master mould
14 Actuating member
16 Groove
18 Recesses
19 Opening for pins
20 Carrier
22 Spherical body
23 Depressions
24 Raceways
28 Outer surface
32 Spring unit
33 Recess
34 Screw body/screw nut
38 Projection
39 Recess
50 Engagement body
52 Engagement member
52a Subarea
53 Rod/shaft
54 Actuating member/hexagonal head
57 Recesses
59 Circumferential sections
62 Webs
70 Locking mechanism
72 Engagement member/stops
72a Wedge-shaped surfaces
74 Lever
75 Recess
76 Arresting member
80 Locking mechanism
81 Screw connection
82 Arresting projection
83 Recess
84 Carrier
85 Spring member
86a/b Arresting heads
87 Sloping surface
88 Tongue
88a Projection
88b Recess
94 Spring member/bore
96 Bore
104 Projection
106 Recess
107 Projection 112 Projection
114 Recess
116 Recess
117 Projection
118 Recess
122 Spring unit
124 Recess
126 Recess
128 Stop
132 Spring unit
136 Recess
142 Spring unit
145 Recess
152 Spring unit
154 Pin
155 Recess
158 Adjustment body
162 Projection
164 Recess
165 Pin
181 Opening
182 Opening
183 Holes
184 Rod, rod-shaped body
186 Projection
187 Rod, rod-shaped body
189 Magnet
191 Stop
192 Rod
193 Lever
194 Bracket
195 Engagement member
197 Recess of the blow mould
198 Recess of the carrier
199 Carrier
202 Blow mould
204 Blow mould carrier
212 Engagement member
214 Actuating means (screw)
300 Spring member
301 Pressure member
302 Adhesion
303 Valve
304 Recess
307 Recess
310 Tension rod
311 Cut-out
312 Spring-loaded engagement member
314 Recess
315 Rod-shaped actuating member
316 Eccentric quick clamping element
325 Spring groove element
326 Plunger
327 Gear-shaped engagement member
328 Tooth-shaped recess
337 Hook-shaped recess
338 Hook-shaped engagement member
346 Recess
347 Rotary axis element
348 Connection element
349 Pin
359 Sealing element
360 Vacuum cylinder
361 Venturi valve
362 Pressure cylinder
363 Sensor
364 Production system L Longitudinal direction
T Direction
E Plane
P1 Arrow
R Direction
X Pivot axis
Z Axis

The invention claimed is:

1. A blow mould assembly for moulding plastic preforms into plastic containers, comprising a blow mould unit forming a cavity, within which the plastic preforms can be expanded into plastic containers, said blow mould unit being formed at least in two parts, and comprising a blow mould holder for receiving the blow mould unit, wherein the blow mould holder has at least two mould holder elements for receiving parts of the blow mould unit, and comprising a locking mechanism in order to arrest at least a part of the blow mould unit in relation to at least one mould holder element, said locking mechanism having an engagement member, which engagement member rests in an arrested condition of part of the blow mould unit in relation to a mould holder element on a section of part of the blow mould unit, wherein the locking mechanism has an actuating member which is displaceable in a z-direction in order to achieve an arrest of the blow mould unit relative to the blow mould holder, wherein the actuating member comprises a rod arranged inside the blow mould unit, and in order to achieve an arrest between the mould holder element and the blow mould unit, a movement of the actuating member is coupled to a movement of the engagement member.

2. The blow mould assembly as claimed in claim 1, wherein a maximum rotary angle (a) of the engagement member is an angle selected from the group consisting of less than 360°, less than 180° and less than 100°.

3. The blow mould assembly as claimed in claim 1, wherein the engagement member is disposed on a carrier and this carrier is disposed on the blow mould holder.

4. The blow mould assembly as claimed in claim 1, wherein the locking mechanism includes at least two engagement members which are disposed one after the other in a longitudinal direction (L) of the blow mould unit.

5. The blow mould assembly as claimed in claim 1, wherein the locking mechanism includes at least two engagement members and the blow mould unit is disposed between these engagement members.

6. The blow mould assembly as claimed in claim 1, wherein the engagement member latches in at least one rotary position.

7. The blow mould assembly as claimed in claim 1, wherein the engagement member latches in exactly two rotary positions.

8. The blow mould assembly as claimed in claim 1, wherein the engagement member is rotatably supported by at least two spherical bodies.

9. The blow mould assembly as claimed in claim 8, wherein the spherical bodies are disposed in raceways.

10. The blow mould assembly as claimed in claim 1, wherein the engagement member includes at least one rounded outer surface.

11. The blow mould assembly as claimed in claim 1, wherein the blow mould assembly includes a spring unit in order to pretension the engagement member in relation to the carrier.

12. The blow mould assembly as claimed in claim 1, wherein the blow mould assembly includes a securing mechanism that prevents the blow mould unit from closing in the case the blow mould unit is not correctly arrested.

13. The blow mould assembly as claimed in claim 1, wherein the blow mould assembly includes at least two actuating members and each of these actuating members includes respectively one projection and one recess, wherein in a closed condition of the blow mould, at least one projection of one actuating member engages in the recess of the other actuating member.

14. The blow mould assembly as claimed in claim 1, wherein the blow mould assembly includes a liquid line with at least one feed connection for feeding liquid and the blow mould holder includes at least one supply connection for supplying the liquid line, and the feed connection can be connected to the supply connection by way of a locking process for arresting the blow mould unit with the blow mould holder.

15. A stretch blow moulding machine having a plurality of blow moulding stations, wherein the plastic preforms can be moulded into plastic containers, wherein at least one of these blow moulding stations includes a blow mould assembly as claimed in claim 1.

16. A blow mould assembly for moulding plastic preforms into plastic containers, comprising a blow mould unit forming a cavity, within which the plastic preforms can be expanded into plastic containers, said blow mould unit being formed at least in two parts, and comprising a blow mould holder for receiving the blow mould unit, wherein the blow mould holder has at least two mould holder elements for receiving parts of the blow mould unit, and comprising a locking mechanism in order to arrest at least a part of the blow mould unit in relation to at least one mould holder element, said locking mechanism having an engagement member that can be pivoted and/or displaced in relation to a specified axis (X), which engagement member rests in an arrested condition of part of the blow mould unit in relation to a mould holder element on a section of part of the blow mould unit, wherein the locking mechanism has an actuating member comprising a rod having an eccentric profile, wherein in order to achieve an arrest between the blow mould holder elements and the blow mould unit, a movement of the actuating member is coupled to a movement of the engagement member.

* * * * *